United States Patent [19]
Kumagai et al.

[11] Patent Number: 6,109,037
[45] Date of Patent: Aug. 29, 2000

[54] FEED WATER HEATING SYSTEM FOR POWER-GENERATING PLANT

[75] Inventors: Kenji Kumagai; Tadashi Narabayashi, both of Yokohama; Mikihide Nakamaru, Fujisawa; Yutaka Asanuma, Yokohama; Makoto Yasuoka, Yokohama; Michitsugu Mori, Yokohama; Shuichi Ohmori, Kawasaki, all of Japan

[73] Assignees: Kabushiki Kaisha Toshiba, Kawasaki; Tokyo Electric Power Co., Tokyo, both of Japan

[21] Appl. No.: 09/126,416

[22] Filed: Jul. 30, 1998

[30] Foreign Application Priority Data

Jul. 30, 1997 [JP] Japan .................................. 9-204158
Jul. 14, 1998 [JP] Japan ................................ 10-199202

[51] Int. Cl.$^7$ .................................................. F01K 13/00
[52] U.S. Cl. ............................................ 60/677; 60/679
[58] Field of Search ...................................... 60/677, 679

[56] References Cited

U.S. PATENT DOCUMENTS 3,016,712  1/1962  Taylor ................................... 60/677 X
3,029,197  4/1962  Untermyer ............................ 60/677 X

FOREIGN PATENT DOCUMENTS 3-75593  3/1991  Japan .
4-31797  2/1992  Japan .

*Primary Examiner*—Hoang Nguyen
*Attorney, Agent, or Firm*—Foley & Lardner

[57] ABSTRACT

A feed water heating system for heating a feed water for a power-generating plant having a steam turbine, a condenser and a steam generator, comprises: a steam injector unit for receiving a plurality of bled steams having different pressures extracted from the steam turbine and an effluent water discharged from the condenser to mix the effluent water with the plurality of bled steams to raise the temperature and pressure of a mixture of the effluent water with the plurality of bled steams to deaerate and discharge the temperature and pressure raised mixture. The steam injector unit comprises: a multistage steam injector having a plurality of steam injectors connected in series for receiving one of the plurality of bled steams and a feed water to mix the one of the plurality of bled steams with the feed water to raise the temperature and pressure of a mixture of the one of the plurality of bled steams and the feed water to discharge the temperature and pressure raised mixture; a cylindrical container for housing therein the multistage steam injector; and a jet centrifugal deaerator, provided downstream of the multistage steam injector, for receiving a feed water discharged from the multistage steam injector and the bled steams to apply a centrifugal force to the feed water and the bled steams to deaerate the feed water to spatially separate a deaerated feed water from the bled steams to discharge the deaerated feed water.

36 Claims, 27 Drawing Sheets

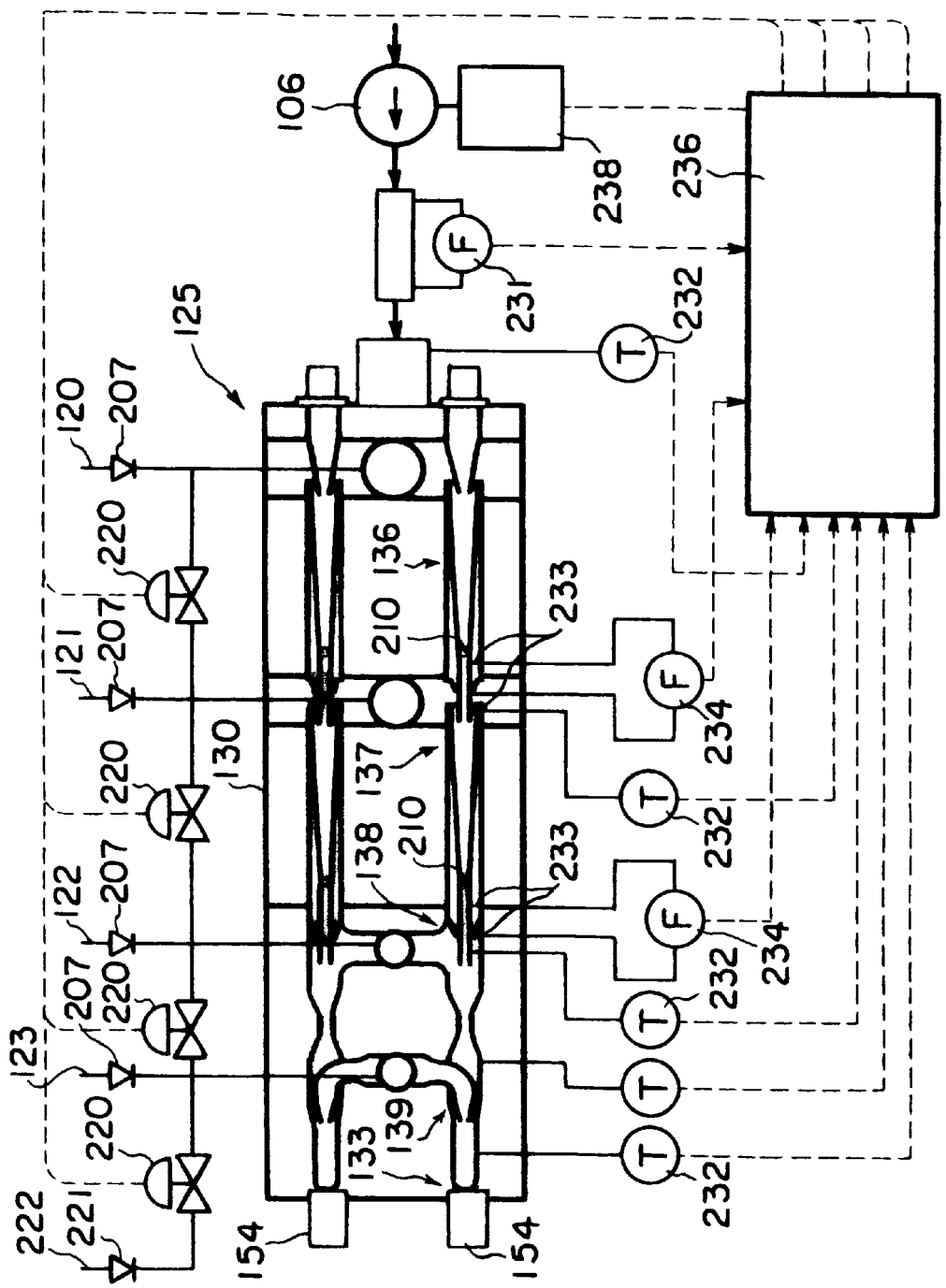
F I G. 22

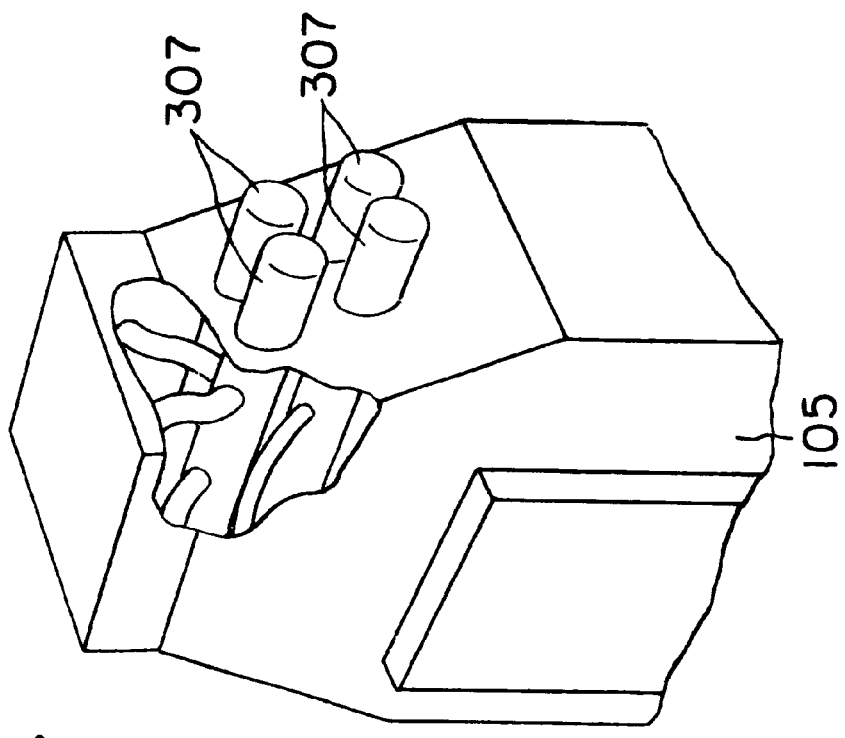
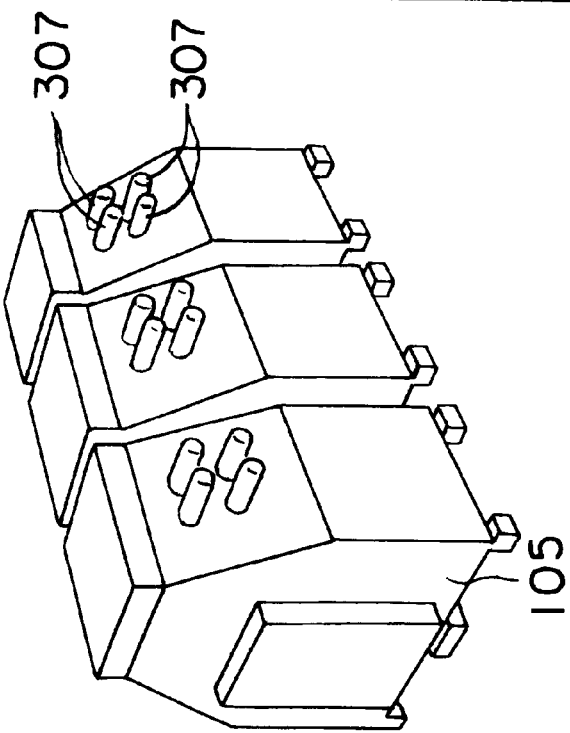
FIG.31(b)
FIG.31(a)

FEED WATER HEATING SYSTEM FOR POWER-GENERATING PLANT

BACKGROUND OF THE INVENTION

1. Field of the Invention

The present invention relates generally to a feed water heating system for a power-generating plant. More specifically, the invention relates to a feed water heating system for a power-generating plant, which has a steam injector for heating a feed water supplied to a nuclear reactor of a nuclear power station, a boiler of a thermal power plant or the like.

2. Related Background Art

First, the background art of the first invention will be described.

FIG. 11 is a schematic view of a power-generating plant turbine system in a power-generating plant.

The steam generated by a steam generator 1 is introduced into a high-pressure side steam turbine 2A via a main steam pipe 13 to drive the high-pressure side steam turbine 2A.

The high-pressure side steam turbine 2A is connected to a low-pressure side steam turbine 2B via a connecting pipe 14. In the middle of the connecting pipe 14, there is provided a heater 11 for heating the steam, which has done work in the steam turbine 2A, with the steam generated by the steam generator 1 or the turbine bled steam.

The steam, which has done work in the low-pressure side steam turbine 2B, is condensed at a condenser 3. The condensed water is temperature and pressure raised by means of a pressure raising pump group 15, feed water heater groups 6a and 6b and feed water pumps 5 to be returned to the steam generator 1 as a feed water.

Thus, the feed water supply system facility in the turbine system of the power-generating plant comprises a multistage, multi series, large rotating equipment, such as pressure raising pumps 15 and feed water pumps 5, and feed wafer heater groups 6a and 6b.

Then, the background art of the second invention will be described.

FIG. 30 shows a feed water heating system 300 for a current advanced boiling water reactor (which will be hereinafter referred to as an "ABWR").

In FIG. 30, a high-pressure steam turbine 102 and a low-pressure steam turbine 103 are driven by the steam generated by a nuclear reactor 101 to drive a generator 104 connected to the high-pressure steam turbine 102 and the low-pressure steam turbine 103. The steam, which has done work in the low-pressure steam turbine 103, is condensed in a condenser 105. The condensate in the condenser 105 is supplied as a feed water 109 to a feed water heating system 300 via an air ejector 107 and a condensate filter/demineralizer 108 by means of a low-pressure condensate pump 106.

The feed water 109 is temperature and pressure raised by means of the feed water heating system 300 to be fed to a high-pressure feed water heating section 111, so that a high-temperature and high-pressure feed water is supplied from the high-pressure feed water heating section 111 to the nuclear reactor 101. Reference number 310 denotes a drain tank. In addition, reference number 311 denotes a low-pressure drain pump, and 110 denotes a high-pressure condensate pump.

This feed water heating system 300 comprises three lines A, B, C of heat exchanger type heaters provided in parallel. Each of the lines A, B, C comprises four heat exchanger type low-pressure feed water heaters 301 connected in series. Thus, the feed water heating system 300 has 12 low-pressure feed water heaters 301 in all.

Bled steams 303, 304, 305, 306 extracted from the low-pressure steam turbine 103 are supplied to the four-stage series low-pressure feed water heaters 301, 301, 301, 301 of the respective lines. When the rated operation is carried out, the pressure of the first state bled steam 303 is 0.05 MPa, and the pressure of the second stage bled steam 304 is 0.1 MPa. In addition, the pressure of the third stage bled steam 305 is 0.21 MPa, and the pressure of the fourth stage bled steam 306 is 0.4 MPa. Each of the low-pressure feed water heaters 301 has a diameter of about 2 m and a length of about 14 m. As shown in FIG. 31, the low-pressure feed water heater 301 is used as a neck heater 307. Four neck heaters 307 for each line are provided on the upper portion of the condenser 105. As shown in FIG. 32, the low-pressure feed water heater 301 serving as the neck neater 307 comprises ten thousands heat-transfer pipes of stainless per one heater. Therefore, chromium, which is one component of stainless steel, is eluted as chromium ion into the feed water to enter into the nuclear reactor 101 to be adhered to equipment in the reactor, and the heat-transfer pipes themselves deteriorate, so that it is required to exchange the heat-transfer pipes every about 20 years. This exchange work requires about a half year since the neck heaters 307 must be drawn out of the upper portion of the condenser 105 to exchange the heat exchanger. The electricity rate corresponding to the quantity of electricity generated by the ABWR for a half year reaches about thirty billion yen. Therefore, it is undesirable to stop the plant for a long term in respect of costs in plant's life. In addition, since the installation height of the neck heaters 307 is added to the height of the condenser 105 by adopting the neck heaters 307, the installation height of the turbine 103 put thereon and the height of a turbine building 309 (see FIG. 29(a)) are increased.

The feed water supply system facility in the turbine system of the power-generating plant comprises a multistage, multi series, large rotating equipment, such as pressure raising pumps and feed water pumps, and feed wafer heater groups. Therefore, there is a problem in that even if the reliability of each equipment is improved, the rate of occurrence of malfunction increases necessarily as a whole since the facility has a plurality of equipment.

SUMMARY OF THE INVENTION

It is therefore an object of the present invention to eliminate the aforementioned problems of the prior art and to provide a feed water heating system for a power-generating plant, which uses a steam injector having a relatively simple structure capable of simultaneously raising the temperature and pressure of a feed water using a steam as a driving source, in the feed water heating system of a turbine system of the power generating plant, so that it is possible to simplify a feed water supply system facility and it is possible to improve maintainability, to reduce the possibility of trouble made by mechanical factors, and to improve the reliability on the stable supply of electric power.

It is another object of the present invention to reduce the size of a feed water heater to reduce the installation space thereof to reduce the size of a turbine building and to prevent the plant from being stopped for a long term in the exchange work by preventing chromium ions from being eluted and a feed water heater from deteriorating by considerably reducing the wetted area of a stainless wall contacting feed water.

In order to accomplish the aforementioned and other objects, there is provided a feed water heating system for heating a feed water for a power-generating plant having a steam turbine, a condenser and a steam generator, the feed water heating system comprising: a feed water means for heating an effluent water discharged from the condenser to supply the heated water to the steam generator, the feed water means having a steam injector for receiving a driving steam and the effluent water to mix the effluent water with the driving steam to raise the temperature and pressure of the mixture.

In this feed water heating system, the driving steam may be a bled steam extracted from the steam turbine.

The feed water means may comprise: a branch line branching from an input side line of the steam generator; pressure reducing means for boiling a feed water introduced via the branch line under reduced pressure; and a flash tank for gas-liquid separating the feed water boiled by the pressure reducing means under reduced pressure, the driving steam being a steam generated by the flash tank.

The feed water means may comprise: a feed water heater provided between an input side of the steam generator and the steam injector; pressure reducing means for boiling a drain of the feed water heater under reduced pressure; and a flash tank for gas-liquid separating a feed water boiled by the pressure reducing means under reduced pressure, the driving steam being a steam generated by the flash tank.

The steam turbine may have a high-pressure side turbine, a low-pressure side turbine located upstream of the high-pressure side turbine, and a moisture-content separating heater, which comprises a moisture-content separator or heater and which is provided between the high-pressure turbine and the low-pressure turbine, and the feed water means may have pressure reducing means for boiling a drain of the moisture-content separating heater under reduced pressure, and a flash tank for gas-liquid separating a feed water boiled by the pressure reducing means under reduced pressure, the driving steam being a steam generated by the flash tank.

The feed water means may comprise: a branch line for supplying a water in the steam generator as a branch water; pressure reducing means for boiling a feed water introduced via the branch line under reduced pressure; and a flash tank for gas-liquid separating the feed water boiled by the pressure reducing means under reduced pressure, the driving steam being a steam generated by the flash tank.

The feed water heating system may further comprise: a feed water pump, provided in parallel to the steam injector, for receiving the effluent water; and a feed water heater provided downstream of the steam injector and the feed water pump.

The feed water means may have regulating means for regulating pressure or temperature of the effluent water inputted to the steam injector.

The regulating means may have a regulating feed water heater for heating the effluent water, and a regulating steam injector for receiving a bled steam extracted from the steam turbine as a driving steam. In addition, a feed water heated by the regulating feed water heater may be inputted to the regulating steam injector, and a feed water outputted from the regulating steam injector may be inputted to the steam injector as the effluent water after being heated by the regulating feed water heater.

According to another aspect of the present invention, there is provided a feed water heating system for heating a feed water for a power-generating plant having a steam turbine, a condenser and a steam generator, the feed water heating system comprising: a steam injector unit for receiving a plurality of bled steams having different pressures extracted from the steam turbine and an effluent water discharged from the condenser to mix the effluent water with the plurality of bled steams to raise the temperature and pressure of a mixture of the effluent water with the plurality of bled steams to deaerate and discharge the temperature and pressure raised mixture, the steam injector unit comprising: a multistage steam injector having a plurality of steam injectors connected in series for receiving one of the plurality of bled steams and a feed water to mix the one of the plurality of bled steams with the feed water to raise the temperature and pressure of a mixture of the one of the plurality of bled steams and the feed water to discharge the temperature and pressure raised mixture; a cylindrical container for housing therein the multistage steam injector; and a jet centrifugal deaerator, provided downstream of the multistage steam injector, for receiving a feed water discharged from the multistage steam injector and the bled steams to apply a centrifugal force to the feed water and the bled steams to deaerate the feed water to spatially separate a deaerated feed water from the bled steams to discharge the deaerated feed water.

In this feed water heating system, the multistage steam injector may comprise: a first stage steam injector, provided at a first stage, for receiving a bled steam having a minimum pressure of the plurality of bled steams; and a final stage steam injector, provided at a final stage, for receiving a bled steam having a maximum pressure of the plurality of bled steams, the first stage steam injector comprising: a water jet nozzle for the first stage for receiving the effluent water to jet the effluent water; a steam nozzle for the first stage for receiving the bled steam of the minimum pressure from the outside of the effluent water jetted from the water jet nozzle for the first stage; and a mixing nozzle for the first stage for mixing the effluent water jetted from the water jet nozzle for the first stage with the bled steam having the minimum pressure received by the steam nozzle for the first stage, to jet a temperature and pressure raised feed water, the final stage steam injector comprising: a water jet nozzle for the final stage for receiving and jetting the temperature and pressure raised feed water; a steam nozzle for the final stage for receiving the bled steam having the maximum pressure from the inside of the feed water jetted from the water jet nozzle for the final stage; and a mixing nozzle for the final stage for mixing the feed water jetted from the water jet nozzle for the final stage with the bled steam having the maximum pressure received by the steam nozzle for the final stage, to jet a temperature and pressure raised feed water.

The multistage steam injector may further comprise at least one intermediate stage steam injector, provided between the first stage steam injector and the final stage steam injector, for receiving a bled steam having an intermediate pressure of the plurality of bled steams.

The water jet nozzle for the first stage of the first stage steam injector may be provided so as to be movable in axial directions with respect to other portions of the multistage steam injector housed in the cylindrical container.

The pressure of each of the plurality of bled steams may be equal to a pressure of each of a plurality of bled steams supplied to a conventional feed water heating system having a heat exchanger type feed water heater.

The jet centrifugal deaerator may comprise: a deaerating jet nozzle for receiving a feed water discharged from the multistage steam injector to convert the feed water into a water droplet fluid, which is as an aggregation of water drops; a diffuser for allowing the water droplet fluid and the bled steam to pass therethrough to deaerate the water droplet fluid by means of the bled steam to raise the pressure of the deaerated water droplet fluid and the bled steam to discharge the deaerated water droplet fluid and the bled steam; and centrifugal force separating means for applying a centrifugal force to a mixture of water and steam comprising the water droplet fluid and the bled steam, which have been discharged from the diffuser, to spatially separate water from steam.

The deaerating jet nozzle may be provided so as to project from a tip portion of the cylindrical container.

The deaerating jet nozzle may comprise: a center nozzle projecting from the center of the tip portion of the cylindrical container in an axial direction of the cylindrical container; and peripheral nozzles, which are located so as to surround the center nozzle and which project so as to be inclined with respect to the axial direction of the cylindrical container.

The diffuser may have a cylindrical straight pipe in vicinity of the deaerating jet nozzle, and a bell mouth at an inlet of the straight pipe.

The centrifugal force separating means may have an elbow-shaped bent pipe, which is formed so that a mixture of water and steam comprising the water droplet fluid and the bled steam flows along an inner wall surface of the bent pipe.

The jet centrifugal deaerator may comprise: a recirculating line for returning the steam spatially separated by the centrifugal force separating means to an inlet side of the diffuser; and a bent pipe for discharging a deaerated steam containing a noncondensing gas to the condenser or a turbine low-pressure stage.

The bled steam inputted to the jet centrifugal deaerator may be a bled steam having a maximum pressure of the plurality of bled steams.

The jet centrifugal deaerator may have a steam jet nozzle for inputting the bled steam into the diffuser, the steam jet nozzle being mounted on a side wall of the diffuser, and an outlet direction of the stem jet nozzle being an axial direction of the diffuser.

According to a further aspect of the present invention, there is provided a feed water heating system for heating a feed water for a power-generating plant having a steam turbine, a condenser and a steam generator, the feed water heating system comprising: a steam injector system for receiving a plurality of bled steams having different pressures extracted from the steam turbine and an effluent water discharged from the condenser to mix the effluent water with the plurality of bled steams to raise the temperature and pressure of a mixture of the effluent water with the plurality of bled steams to deaerate and discharge the temperature and pressure raised mixture, the steam injector system comprising: a cylindrical casing; a plurality of steam injector units provided in the casing in parallel to each other; and a bled steam supply line, provided in the casing, for supplying a plurality of bled steams having different pressures extracted from the steam turbine to each of the plurality of steam injector units, each of the steam injector units comprising: a multistage steam injector having a plurality of steam injectors connected in series for receiving one of the plurality of bled steams and a feed water to mix the one of the plurality of bled steams with the feed water to raise the temperature and pressure of a mixture of the one of the plurality of bled steams and the feed water to discharge the temperature and pressure raised mixture; a cylindrical container for housing therein the multistage steam injector; and a jet centrifugal deaerator, provided downstream of the multistage steam injector, for receiving a feed water discharged from the multistage steam injector and the bled steams to apply a centrifugal force to the feed water and the bled steams to deaerate the feed water to spatially separate a deaerated feed water from the bled steams to discharge the deaerated feed water.

In this feed water heating system, the multistage steam injector may comprise: a first stage steam injector, provided at a first stage, for receiving a bled steam having a minimum pressure of the plurality of bled steams; and a final stage steam injector, provided at a final stage, for receiving a bled steam having a maximum pressure of the plurality of bled steams, the first stage steam injector comprising: a water jet nozzle for the first stage for receiving the effluent water to jet the effluent water; a steam nozzle for the first stage for receiving the bled steam of the minimum pressure from the outside of the effluent water jetted from the waterjet nozzle for the first stage; and a mixing nozzle for the first stage for mixing the effluent water jetted from the water jet nozzle for the first stage with the bled steam having the minimum pressure received by the steam nozzle for the first stage, to jet a temperature and pressure raised feed water, the final stage steam injector comprising: a water jet nozzle for the final stage for receiving and jetting the temperature and pressure raised feed water; a steam nozzle for the final stage for receiving the bled steam having the maximum pressure from the inside of the feed water jetted from the water jet nozzle for the final stage; and a mixing nozzle for the final stage for mixing the feed water jetted from the water jet nozzle for the final stage with the bled steam having the maximum pressure received by the steam nozzle for the final stage, to jet a temperature and pressure raised feed water.

The jet centrifugal deaerator may comprise: a deaerating jet nozzle for receiving a feed water discharged from the multistage steam injector to convert the feed water into a water droplet fluid, which is as an aggregation of water drops; a diffuser for allowing the water droplet fluid and the bled steam to pass therethrough to deaerate the water droplet fluid by means of the bled steam to raise the pressure of the deaerated water droplet fluid and the bled steam to discharge the deaerated water droplet fluid and the bled steam; and centrifugal force separating means for applying a centrifugal force to a mixture of water and steam comprising the water droplet fluid and the bled steam, which have been discharged from the diffuser, to spatially separate water from steam.

The casing may be horizontally arranged and fixed directly to a building floor by means of rigid mounting fixtures using anchor bolts.

The casing may have a detachable inlet-side lid, on which a supply nozzle and a nozzle driving actuator are mounted, the supply nozzle supplying the effluent water to the steam injector unit, and the nozzle driving actuator moving the water jet nozzle for the first stage of the first stage steam injector in axial directions with respect to the mixing nozzle for the first stage of the first stage steam injector housed in the cylindrical container.

The casing may have a detachable outlet-side lid, on which the diffuser of the jet centrifugal deaerator is mounted, and an outlet side of the diffuser projecting from the outlet-side lid.

The casing may have a detachable outlet-side lid, and the multistage steam injector housed in the cylindrical container may be capable of being drawn out of the casing while the outlet-side lid is detached.

The casing may have a closed container portion forming a part of an outlet side thereof, the deaerating jet nozzle being located in the container portion, the inlet-side portion of the diffuser being located in the container portion so as to be spaced from a tip portion of the deaerator jet nozzle, the jet centrifugal deaerator having a recirculating steam line for returning the steam spatially separated by the centrifugal separating means to the container portion.

The feed water heating system may further comprise a buffer tank for storing a feed water deaerated and discharged from the plurality of steam injector units, the water stored in the buffer tank being supplied to the steam generator via a high-pressure condensate pump.

The feed water heating system may further comprise a buffer tank for storing a feed water deaerated and discharged from the plurality of steam injector units, the centrifugal separating means being formed on an inner wall surface of the buffer tank.

The feed water heating system may further comprise bypass feed water means for supplying a feed water to the steam generator when the steam injector system is inoperative.

The feed water heating system may further comprise introduction control means for introducing the steam injector system into a feed water system when a load of the power-generating plant reaches a predetermined load after the power-generating plant is started.

The introduction control means may have means for introducing, as the plurality of bled steams, bled steams of a high-pressure turbine into the steam injector system via a flow regulating valve, thereby introducing the steam injector system into the feed water system when the power-generating plant operates at a lower load than the predetermined load.

The feed water heating system may further comprise overflow water flow control means for minimizing a overflow water flow rate corresponding to a difference between a sum of a feed water flow rate of a feed water supplied to the multistage steam injector and a steam flow rate of the bled steam supplied to the multistage steam injector and a discharge flow rate of an effluent water.

The overflow water flow control means may comprise: means for measuring the feed water flow rate; means for measuring the steam flow rate; means for measuring the discharge flow rate; overflow water flow calculating means for calculating the overflow water flow rate on the basis of results derived by the means for measuring the feed water flow rate, means for measuring the steam flow rate, and means for measuring the discharge flow rate; and regulating means for regulating the feed water flow rate and the steam flow rate on the basis of a result of the overflow water flow calculating means.

The feed water heating system may further comprise feed water flow regulating means for regulating a feed water flow rate of a feed water supplied to the multistage steam injector, the feed water regulating means having means for controlling a revolving speed of a low-pressure condensate pump provided upstream of the steam injector system.

The feed water heating system may further comprise feed water flow regulating means for regulating a feed water flow rate of a feed water supplied to the multistage steam injector, the feed water regulating means having a flow regulating valve provided upstream of the steam injector system for regulating a flow rate of the effluent water.

The feed water heating system may further comprise feed water flow regulating means for regulating a feed water flow rate of a flow rate supplied to the multistage steam injector, the feed water flow regulating means comprising: a hollow regulating pipe being movable in axial directions in the water jet nozzle for the first stage of the first stage steam injector for adjusting an opening size of an outlet of the water jet nozzle for the first stage, the effluent water being supplied into the hollow regulating pipe; and a nozzle driving actuator for moving the hollow regulating pipe in the axial directions.

The cylindrical container may have a drain hole for discharging an overflow water, and a deaerating line for returning the overflow water discharged from the drain hole to the condenser or a low-pressure stage of the steam turbine via an orifice or a check valve, to deaerate the overflow water.

The feed water heating system may further comprise a deaerating line for returning a part of a feed water discharged from the jet centrifugal deaerator to the condenser via an orifice or a check valve and for deaerating the part of the feed water.

The cylindrical container may have a drain hole for discharging an overflow water, and a returning line for returning the overflow water discharged from the drain hole to the condenser or a condensate storage tank via an orifice or a check valve.

The feed water heating system may further comprise: a buffer tank for storing a feed water deaerated and discharged from the plurality of steam injector units; feed water flow regulating means for regulating a feed water flow rate of a feed water supplied to the multistage steam injector; and stored volume measuring means for measuring a stored volume of a feed water stored in the buffer tank, the feed water flow regulating means controlling a revolving speed of a low-pressure condensate pump provided upstream of the steam injector system or a flow regulating valve provided upstream of the steam injector system for regulating a flow rate of the effluent water, on the basis of a measured result of the stored volume measuring means so that the stored volume is a predetermined volume.

The feed water heating system may further comprise an auxiliary steam line, connected via an orifice or a check valve to a steam supply line for supplying the plurality of bled steams to the steam injector system, for supplying a main steam to the steam injector system when a turbine trip is carried out.

The outer surface of the casing may be covered with a protective member of a heat insulating material or a sound absorbing material.

According to a still further aspect of the present invention, there is provided a feed water heating system for heating a feed water for a power-generating plant having a steam turbine, a condenser and a steam generator, the feed water heating system comprising: a plurality of steam injector systems, arranged in series, for receiving a plurality of bled steams having different pressures extracted from the steam turbine and an effluent water discharged from the condenser to mix the effluent water with the plurality of bled steams to raise the temperature and pressure of a mixture of the effluent water with the plurality of bled steams to deaerate and discharge the temperature and pressure raised mixture, each of the steam injector systems comprising: a cylindrical casing; a plurality of steam injector units provided in the casing in parallel to each other; and a bled steam supply line, provided in the casing, for supplying a plurality of bled steams having different pressures extracted from the steam turbine to each of the plurality of steam injector units, each of the steam injector unit receiving the plurality of bled steams from the bled steam supply line and an effluent water discharged from the condenser to mix the effluent water with the plurality of bled steams to raise the temperature and pressure of a mixture of the effluent water with the plurality of bled steams to deaerate and discharge the temperature and pressure raised mixture, each of the steam injector units comprising: a multistage steam injector having a plurality of steam injectors connected in series for receiving one of the plurality of bled steams and a feed water to mix the one of the plurality of bled steams with the feed water to raise the temperature and pressure of a mixture of the one of the plurality of bled steams and the feed water to discharge the temperature and pressure raised mixture; a cylindrical container for housing therein the multistage steam injector; and a jet centrifugal deaerator, provided downstream of the multistage steam injector, for receiving a feed water discharged from the multistage steam injector and the bled steams to apply a centrifugal force to the feed water and the bled steams to deaerate the feed water to spatially separate a deaerated feed water from the bled steams to discharge the deaerated feed water.

In this feed water heating system, the multistage steam injector may comprise: a first stage steam injector, provided at a first stage, for receiving a bled steam having a minimum pressure of the plurality of bled steams; and a final stage steam injector, provided at a final stage, for receiving a bled steam having a maximum pressure of the plurality of bled steams, the first stage steam injector comprising: a water jet nozzle for the first stage for receiving the effluent water to jet the effluent water; a steam nozzle for the first stage for receiving the bled steam of the minimum pressure from the outside of the effluent water jetted from the waterjet nozzle for the first stage; and a mixing nozzle for the first stage for mixing the effluent water jetted from the water jet nozzle for the first stage with the bled steam having the minimum pressure received by the steam nozzle for the first stage, to jet a temperature and pressure raised feed water, the final stage steam injector comprising: a water jet nozzle for the final stage for receiving and jetting the temperature and pressure raised feed water; a steam nozzle for the final stage for receiving the bled steam having the maximum pressure from the inside of the feed water jetted from the water jet nozzle for the final stage; and a mixing nozzle for the final stage for mixing the feed water jetted from the water jet nozzle for the final stage with the bled steam having the maximum pressure received by the steam nozzle for the final stage, to jet a temperature and pressure raised feed water.

The jet centrifugal deaerator may comprise: a deaerating jet nozzle for receiving a feed water discharged from the multistage steam injector to convert the feed water into a water droplet fluid, which is as an aggregation of water drops; a diffuser for allowing the water droplet fluid and the bled steam to pass therethrough to deaerate the water droplet fluid by means of the bled steam to raise the pressure of the deaerated water droplet fluid and the bled steam to discharge the deaerated water droplet fluid and the bled steam; and centrifugal force separating means for applying a centrifugal force to a mixture of water and steam comprising the water droplet fluid and the bled steam, which have been discharged from the diffuser, to spatially separate water from steam.

According to the present invention, the driving steam is used as a driving source, and the temperature and pressure of the effluent water discharged from the steam turbine are raised by means of the steam injector. Therefore, it is possible to simultaneously raise the temperature and pressure of the feed water supplied to the steam generator with a relatively simple structure, so that it is possible to simplify a feed water supply system facility and it is possible to improve maintainability, to reduce the possibility of trouble made by mechanical factors, and to improve the reliability on the stable supply of electric power.

The driving steam serving as the driving source may be any one of various steams generated in the feed water heating system for the power-generating plant. For example, the bled steam of the steam turbine may be used as the driving steam.

In addition, the feed water heating system may have a pressure reducing means for extracting and boiling the feed water of the inlet side of the steam generator under reduced pressure, and a flash tank for gas-liquid separating the fluid boiled under reduced pressure, so that the gas-liquid separated steam generated by the flash tank can be used as the driving steam serving as the driving source. In this case, if the steam generated by boiling a feed water having a high enthalpy under reduced pressure is used to drive the steam injector, it is possible to obtain the same advantages as those in the case where the bled steam of the steam turbine is used as the driving source.

In addition, the feed water heating system may have a pressure reducing means for boiling a drain, which is generated by the feed water heater for raising the temperature of the feed water, under reduced pressure, a flash tank for gas-liquid separating the fluid boiled under reduced pressure, and a steam injector for raising the temperature and pressure of the feed water using the gas-liquid separated steam generated by the flash tank as a driving source. In this case, if the drain generated by the feed water heater for raising the temperature of the feed water of the power-generating plant is boiled under reduced pressure and if the steam thus generated is used to drive the steam injector in place of the bled steam of the steam turbine, it is possible to obtain the same advantages as those in the case where the bled steam of the steam turbine is used as the driving source.

In addition, the feed water heating system may have a pressure reducing means for boiling the drain generated by the heater under reduced pressure, a flash tank for gas-liquid separating the fluid boiled under reduced pressure, and a steam injector for raising the temperature and pressure of the feed water using the gas-liquid separated steam generated by the flash tank as the driving source. In this case, the drain generated by the heater may be used, so that the same advantages can be obtained.

Moreover, the feed water heating system may have a pressure reducing means for boiling the water in the steam generator under reduced pressure, a flash tank for gas-liquid separating the feed water boiled under reduced pressure, and a steam injector for raising the temperature and pressure of the feed water using the gas-liquid separated steam generated by the flash tank as the driving source. In this case, the water in the steam generator may be substituted for the feed water, so that the same advantages can be obtained. Furthermore, the water in the steam generator may be supplied directly to the pressure reducing means. Alternatively, the water in the steam generator may be supplied to the pressure reducing means via a line branching from the facility for receiving the water in the steam generator, such as a feed water recirculating facility.

In addition, the steam injector and the feed water pump may be arranged in parallel. In this case, if the water-conveyance is carried out by means of the feed water pump at the operating stage that the steam condition for driving the steam injector is insufficient, and thereafter, the steam injector is operated at the stage that the steam condition is established as the driving steam, it is possible to reduce the possibility of trouble, and is possible to cope with the case where the steam pressure is low when the plant is stopped.

In addition, a plurality of steam injectors may be arranged in series to raise the temperature and pressure of the feed water, so that it is possible to reduce the size of the steam injector while ensuring the water-conveyance pressure.

In addition, if a heater or a cooler is provided on the inlet side of the steam injector to raise enthalpy of the driving steam at the inlet portion of the steam injector or lower the inlet temperature of the feed water, it is possible to improve the temperature and pressure raised by the steam injector.

According to the present invention, there is provided a new type feed water heating system, which is substituted for a conventional feed water heating system having a heat exchanger type feed water heater and which has a multistage steam injector for receiving, in multistage, a plurality of bled steams having different pressures extracted from a steam turbine, and a jet centrifugal deaerator having deaerating function.

BRIEF DESCRIPTION OF THE DRAWINGS

The present invention will be understood more fully from the detailed description given herebelow, and from the accompanying drawings of the preferred embodiments of the invention. However, the drawings are not intended to imply limitation of the invention to a specific embodiment, but are for explanation and understanding only.

In the drawings:

FIG. 22 is a block diagram of another control unit for minimizing the flow rate of overflow water discharged from drain holes of the first stage steam injector and the nest stage steam injector;

FIG. 31(a) is a perspective view showing that a low-pressure feed water heater is used as a neck heater in a conventional feed water heating system for an advanced boiling water reactor, and FIG. 31(b) is an enlarged view of a part thereof.

DESCRIPTION OF THE PREFERRED EMBODIMENTS

Referring now to the accompanying drawings, the preferred embodiments of the present invention will be described below.

Referring to FIGS. 1 through 10, the first invention of the present application will be described.

Figure 2:
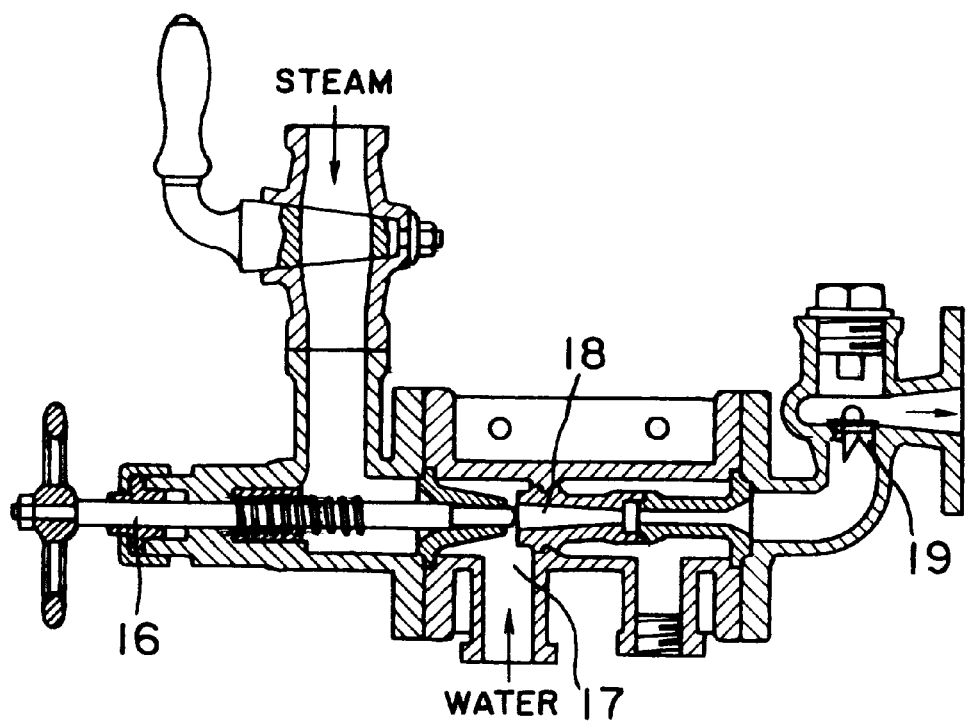
FIG. 2 is a sectional view of a steam injector.

First, referring to FIG. 2, the operation principle of a steam injector for use in the present invention will be described.

An needle valve provided at the tip of an arbor 16 is open to introduce a driving steam serving as a driving source to inject the steam into a mixing chamber 17. An effluent water has been supplied from a steam turbine 2 to the mixing chamber 17. While the injected steam is rapidly condensed in a pipe 18, the injected steam transmits a kinetic energy to an inputted water, which becomes a high-speed stream of water to push and open a valve 19 to flow out. At this time, since the high-speed stream of water contains a condensed water of steam, the high-speed stream becomes a stream of water having a higher temperature than that of the feed water to flow out. Thus, the effluent water discharged from the condenser 3 is temperature and pressure raised while passing through the steam injector.

Figure 3:
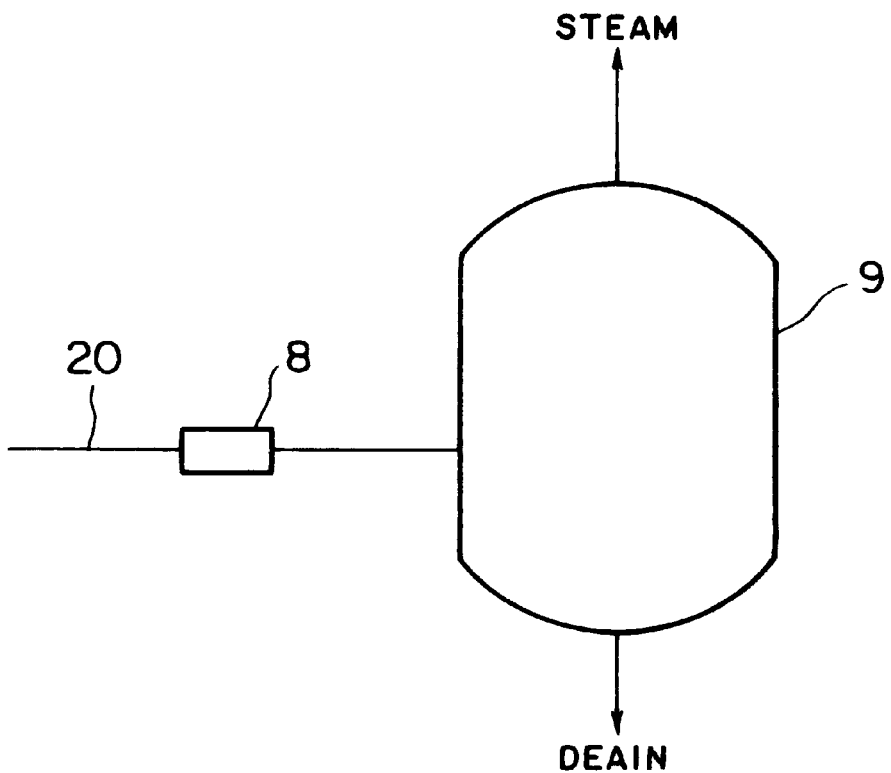
FIG. 3 is a schematic view of a flash tank and a pressure reducing device.

Referring to FIG. 3, a steam generating means comprising a flash tank 9 will be described below.

The fluid introduced by a branch line 20 is pressure-reduced in a pressure reducing device 8 to be a two-phase flow to be introduced into the flash tank 9. The two-phase flow is divided into a gas phase part and a liquid phase part in the flash tank 9.

The first preferred embodiment of the first invention of the present application will be described below.

Figure 1:
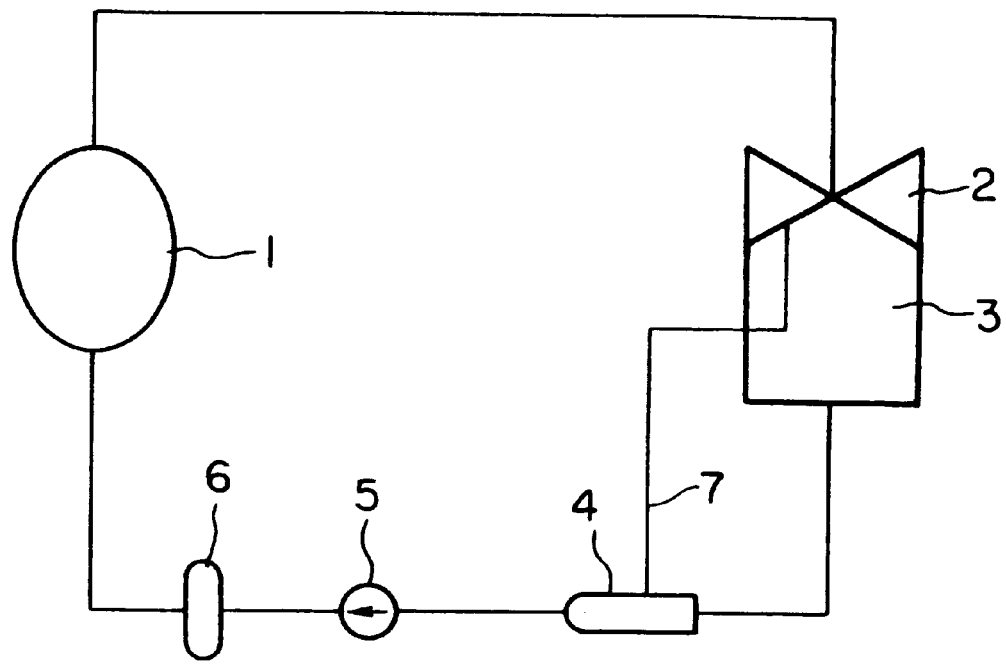
FIG. 1 is a schematic view of the first preferred embodiment of the present invention.

FIG. 1 is a schematic view of the first preferred embodiment of a turbine system of a power-generating plant according to the present invention.

FIG. 1 shows a turbine system for a power-generating plant, which comprises: a steam generator 1; a steam turbine 2 driven by a steam generated by means of the steam generator 1; a condenser 3 for condensing the steam, which has done work in the steam turbine 2; a steam injector 4 for raising the temperature and pressure of the condensed feed water; a feed water pump 5; a feed water heater 6; and a driving steam supply line 7 for supplying a steam turbine bleed to the steam injector 4. The steam generator 1 may be a nuclear reactor, a complex of a nuclear reactor and a heat exchanger, or a boiler.

The ordinary operation will be described below.

The steam, which has done work in the steam turbine 2, is condensed in the condenser 3. The condensed water is temperature and pressure raised by the steam injector 4, the feed water pump 5 and the feed water heater 6 to be returned to the steam generator 1.

Figure 11:
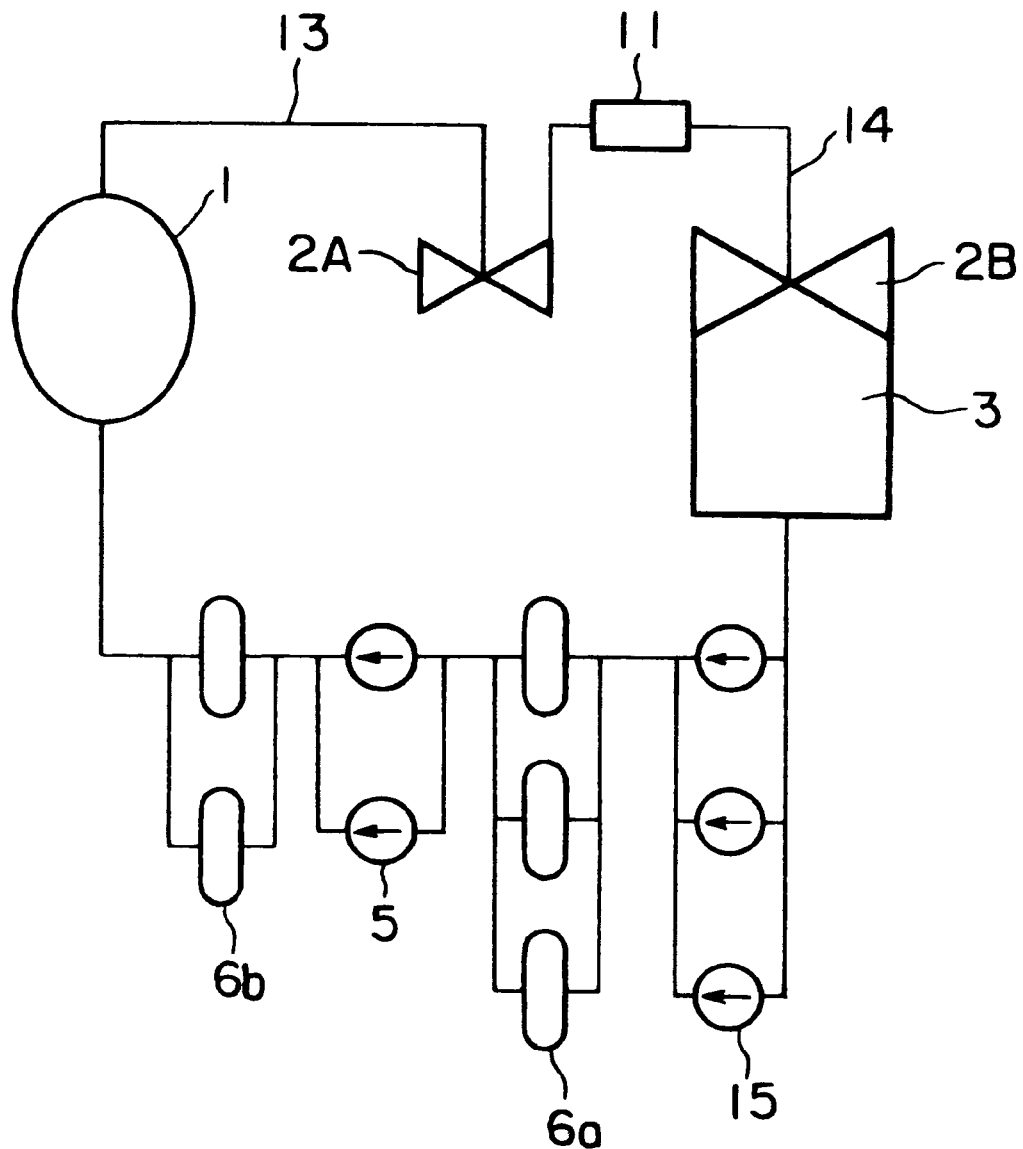
FIG. 11 is a schematic view of a turbine system of a conventional power-generating plant.

The steam injector 4 itself can also raise the temperature and pressure of the water condensed by the condenser 3. Consequently, the stage numbers of the feed water pumps 5 and the feed water heaters 6 can be reduced in comparison with the turbine system of FIG. 11. In addition, no feed water pump 5 and no feed water heater 6 may be provided.

According to this preferred embodiment, since it is possible to simplify the feed water supply facility by using the steam injector 4, it is possible to improve maintainability and it is possible to reduce the possibility of trouble made by mechanical factors, so that it is possible to improve the reliability on the stable supply of electric power.

The second preferred embodiment of the present invention will be described below.

Figure 4:
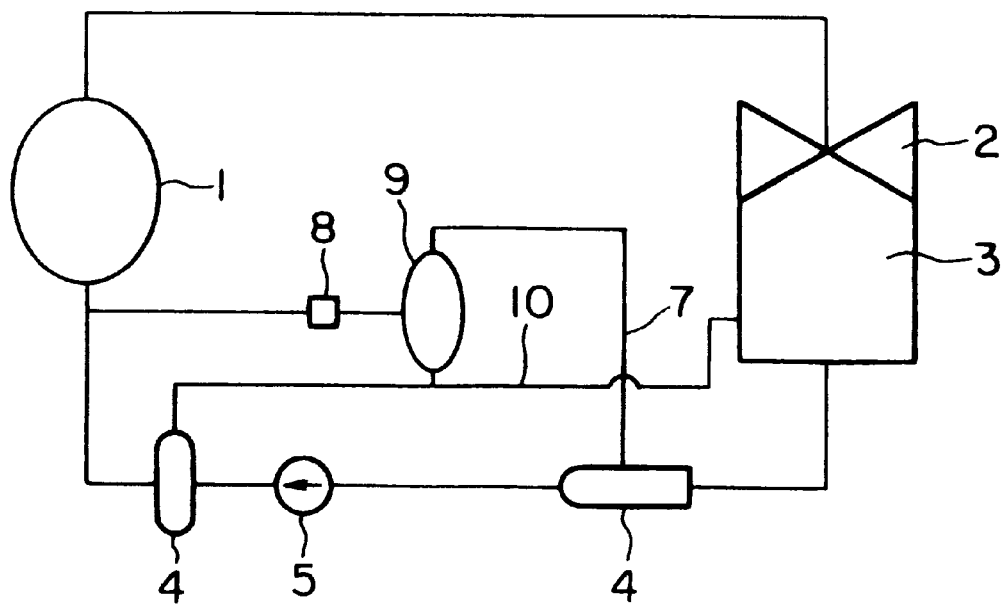
FIG. 4 is a schematic view of the second preferred embodiment of the present invention.

FIG. 4 is a schematic view of the second preferred embodiment of a turbine system of a power-generating plant according to the present invention.

In this embodiment, a turbine system for a power-generating plant comprises: a steam generator 1; a steam turbine 2 driven by a steam generated by means of the steam generator 1; a condenser 3 for condensing the steam, which has done work in the steam turbine 2; a steam injector 4 for raising the temperature and pressure of the feed water condensed by the condenser 3; a feed water pump 5; a feed water heater 6 provided between the feed water pump 5 and the inlet side of the steam generator 1; a pressure reducing device 8 branching from the inlet side of the steam generator for extracting a part of the feed water to boil the extracted feed water under reduced pressure; a flash tank 9 for steam-separating the fluid boiled under reduced pressure; a driving steam supply line 7 for supplying the steam-separated steam generated by the flash tank 9 to the steam injector 4 as a driving source; and a drain line 10 for recovering the steam-separated drain generated by the flash tank 9.

According to this preferred embodiment, since a part of the feed water supplied to the inlet side of the steam generator 1 is used as a driving steam serving as a driving source for the steam injector 4, it is not required to provide any lines for generating the driving steam in the condenser 3 or the like, so that it is possible to simplify the structures of the steam turbine 2, the condenser 3 and so forth.

The third preferred embodiment of the present invention will be described below.

Figure 5:
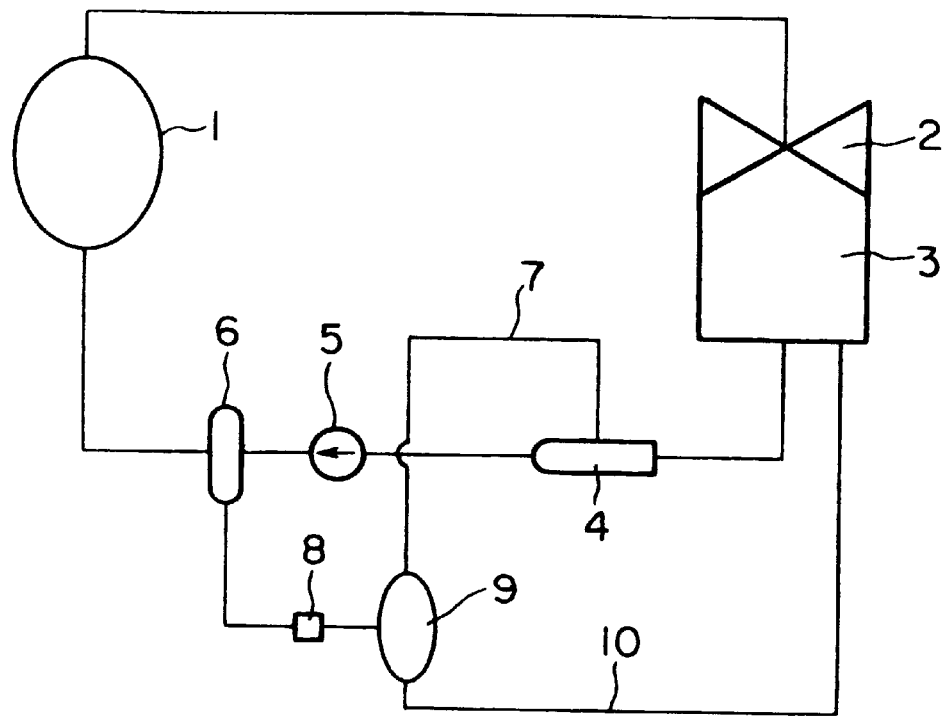
FIG. 5 is a schematic view of the third preferred embodiment of the present invention.

FIG. 5 shows the third preferred embodiment of a turbine system for a power-generating plant according to the present invention. In this turbine system, the drain generated by a feed water heater 6 is boiled under reduced pressure in a pressure reducing device 8 to be steam-separated to be used as a driving steam for driving a steam injector 4.

According to this preferred embodiment, since it is possible to generate the driving steam by using the drain generated by the feed water heater 6 provided between a feed water pump 5 and the inlet side of a steam generator 1, it is possible to simplify the system.

The fourth preferred embodiment of the present invention will be described below.

Figure 6:
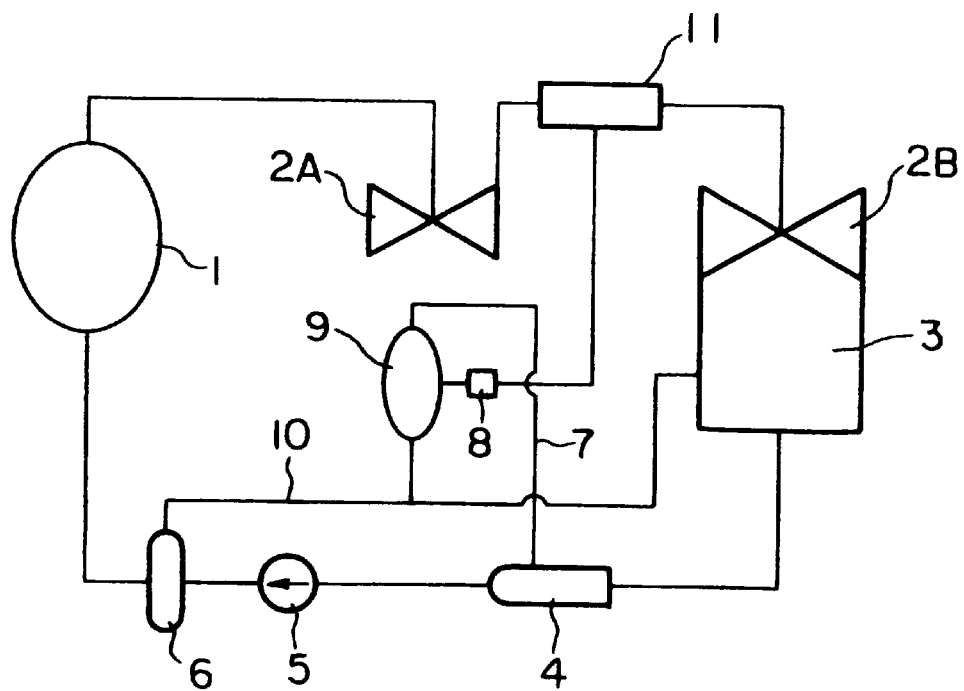
FIG. 6 is a schematic view of the fourth preferred embodiment of the present invention.

FIG. 6 shows the fourth preferred embodiment of a turbine system for a power-generating plant according to the present invention. This turbine system comprises: a steam generator 1; a high-pressure steam turbine 2A driven by a steam generated by the steam generator 1; a heater 11 for moisture-content separating or heating the steam, which has done work in the high-pressure steam turbine 2A; a low-pressure steam turbine 2B driven by the steam passing through the heater 11; a condenser 3 for condensing the steam, which has done work in the low-pressure steam turbine 2B; a steam injector 4 for raising the temperature and pressure of the condensed water generated by the condenser as a feed water; a feed water heater 6; a feed water pump 5; a pressure reducing device 8 for boiling the drain, which has been generated by the heater 11, under reduced pressure; a flash tank 9 for steam-separating the fluid boiled under reduced pressure; a driving steam supply line 7 for supplying the steam-separated steam generated by the flash tank 9 to the steam injector 4 as a driving steam serving as a driving source; and a drain line 10 for recovering the steam-separated drain generated by the flash tank 9.

According to this preferred embodiment, since the feed water can be temperature and pressure raised by the steam injector 4 similar to the aforementioned preferred embodiment, it is possible to minimize the required numbers of the feed water pumps 5 and feed water heaters 6.

In addition, since the steam is generated by using the drain of the heater 11, which is provided between the high-pressure steam turbine 2A and the low-pressure steam turbine 2B, as a driving steam serving as a driving source for the steam injector 4, it is not required to provide any new lines in the condenser 3 or the like. Therefore, it is possible to simplify the system and it is possible to reduce the possibility of trouble, so that it is possible to improve the reliability on the stable supply of electric power including the start-stop of the plant.

The fifth preferred embodiment of the present invention will be described below.

Figure 7:
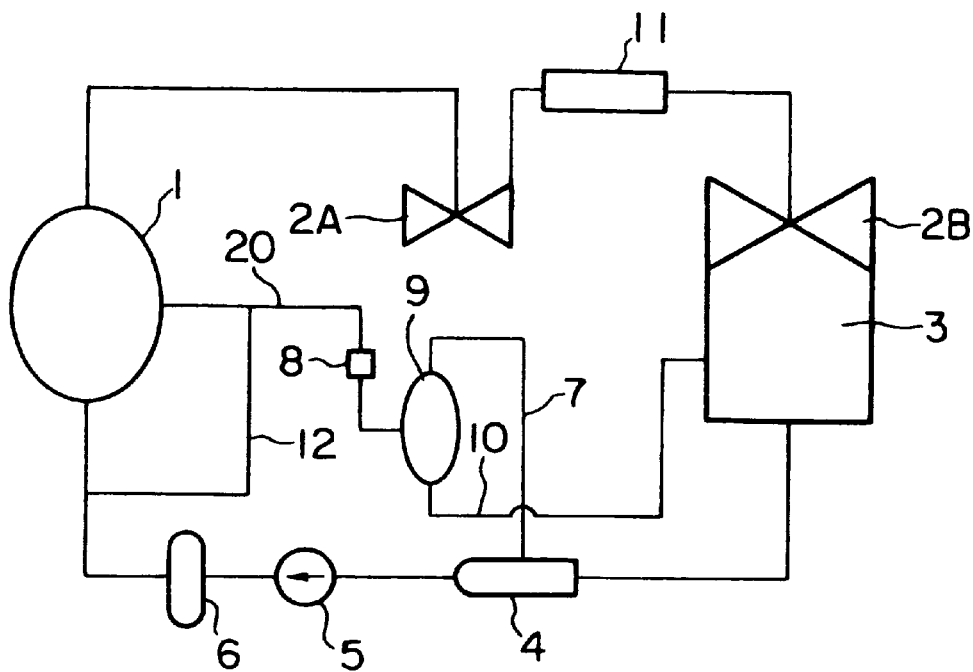
FIG. 7 is a schematic view of the fifth preferred embodiment of the present invention.

FIG. 7 shows the fifth preferred embodiment of the present invention. Unlike the preferred embodiment of FIG. 6, a part of the feed water supplied to the inlet side of a steam generator 1 and the water in the steam generator 1 are introduced into a pressure reducing device 8 and a flash tank 9 via a feed water circulating facility 12 and a branch line 20 to generate a steam for driving a steam injector 4.

According to this preferred embodiment, since the driving steam is generated by using the water in the steam generator 1, it is possible to simplify the system and it is possible to reduce the possibility of trouble, so that it is possible to improve the reliability on the stable supply of electric power including the start-stop of the plant.

The sixth preferred embodiment of the present invention will be described below.

Figure 8:
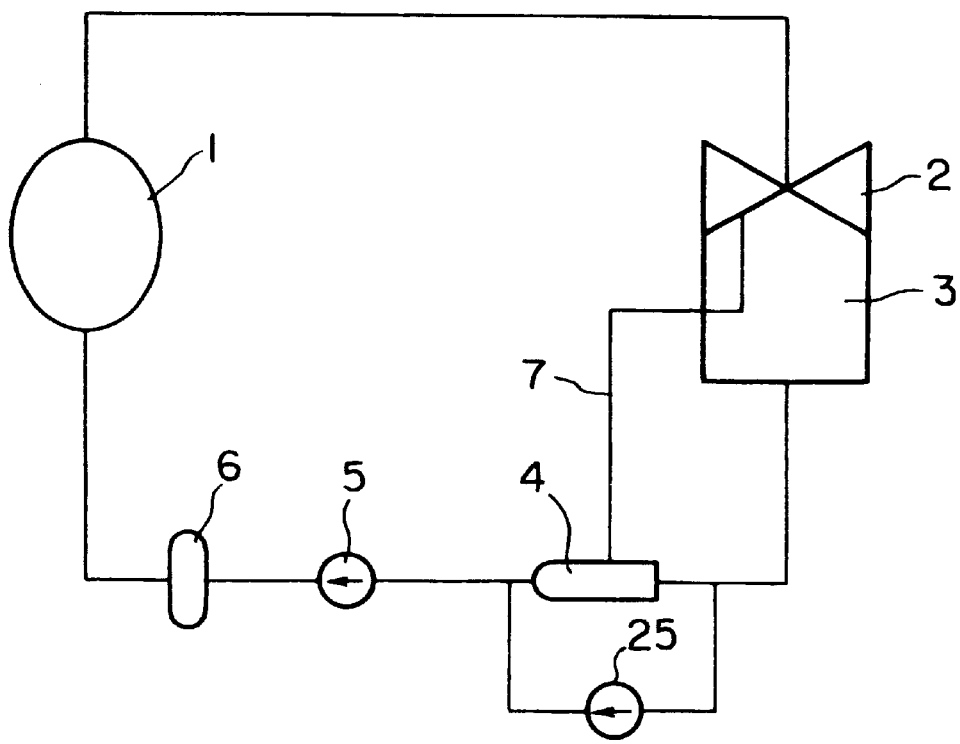
FIG. 8 is a schematic view of the sixth preferred embodiment of the present invention.

FIG. 8 shows the sixth preferred embodiment of a turbine system for a power-generating plant according to the present invention. In this system, a feed water pump 25 is provided in parallel to the steam injector 4 in the first preferred embodiment shown in FIG. 1.

According to this preferred embodiment, at the stage that the steam condition of a driving steam for driving the steam injector 4 is insufficient, e.g., at the operating stage of the plant, the water-conveyance can be carried out by means of the feed water pump 25. Thereafter, at the stage that the steam condition is established as a driving steam, the temperature and pressure are raised by means of the steam injector 4. Therefore, it is possible to reduce the possibility of trouble, and is possible to improve the reliability on the stable supply of electric power including the start-stop of the plant.

The seventh preferred embodiment of the present invention will be described below.

Figure 9:
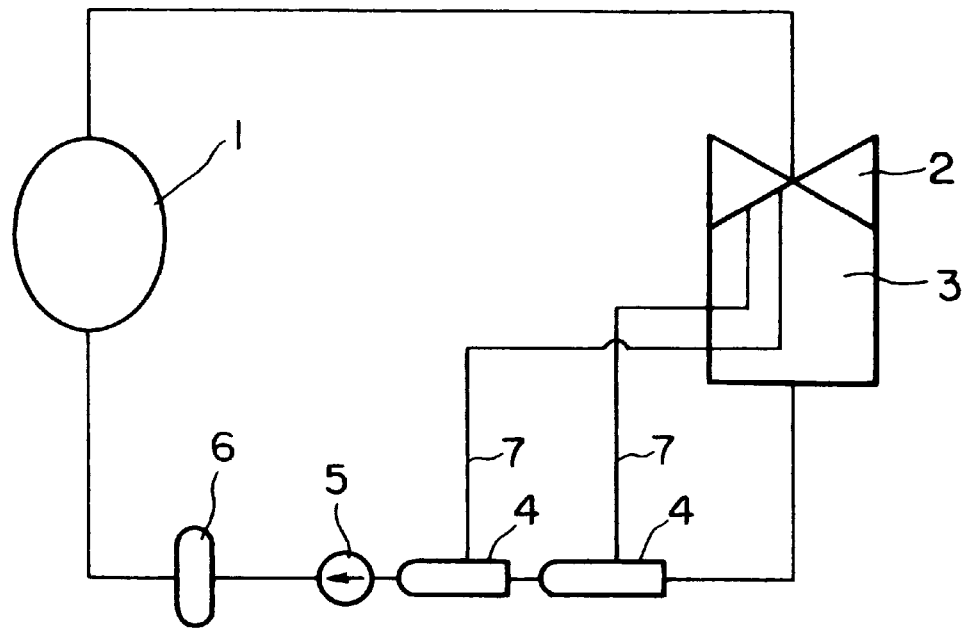
FIG. 9 is a schematic view of the seventh preferred embodiment of the present invention.

FIG. 9 shows the seventh preferred embodiment of a turbine system for a power-generating plant according to the present invention. In this turbine system, a plurality of steam injectors 4, e.g., two steam injectors 4, each of which is the same as that in the first preferred embodiment shown in FIG. 1, are arranged in series.

According to this preferred embodiment, since the plurality of steam injectors 4 are connected in series, it is possible to reduce the size of the steam injector 4 and it is possible to ensure the water-conveyance pressure. In addition, since the plurality of steam injectors 4 are substituted for a rotating equipment, such as a pump 5, and a feed water heater 6, it is possible to reduce the possibility of trouble made by mechanical factors, and it is possible to improve the reliability on the stable supply of electric power.

The eighth preferred embodiment of the present invention will be described below.

Figure 10:
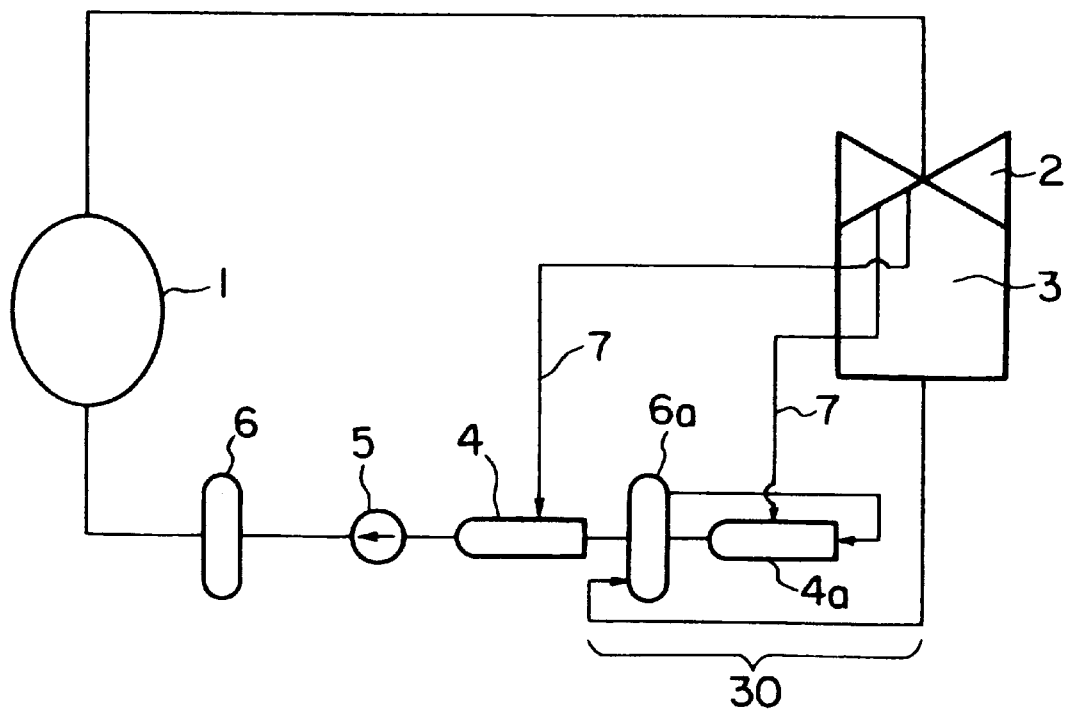
FIG. 10 is a schematic view of the eighth preferred embodiment of the present invention.

FIG. 10 shows the eighth preferred embodiment of the present invention. In this preferred embodiment, a regulating means 30 for regulating the temperature or pressure of a feed water inputted to a steam injector 4 is provided on the inlet side of the steam injector 4.

For example, as the water is inputted to the steam injector 4 at a lower temperature, it is more efficiently pressure raised to be outputted from the steam injector 4.

The regulating means 30 regulates the temperature or temperature condition of the inputted feed water so that the fluid inputted to the steam injector 4 is most efficiently temperature and pressure raised to be outputted.

The regulating means 30 shown in FIG. 10 has a regulating steam injector 4a and a regulating feed water heater 6a. The regulating means 30 shown in FIG. 10 has a so-called inner cooler.

The regulating feed water heater 6a heats the feed water condensed by a condenser 3 to transmit the heated feed water to the regulating injector 4a. The regulating injector 4a is driven by using the bled steam extracted from a steam turbine 2 as a driving steam. The feed water temperature and pressure raised by the regulating injector 4a is supplied to the same steam injector 4 as that in the preferred embodiment shown in FIG. 1.

According to this preferred embodiment, since the regulating means 30 is provided, it is possible to input the fluid to the steam injector 4 on the optimum condition.

Referring to FIGS. 12 through 32, the second invention of the present application will be described below.

Figure 12:
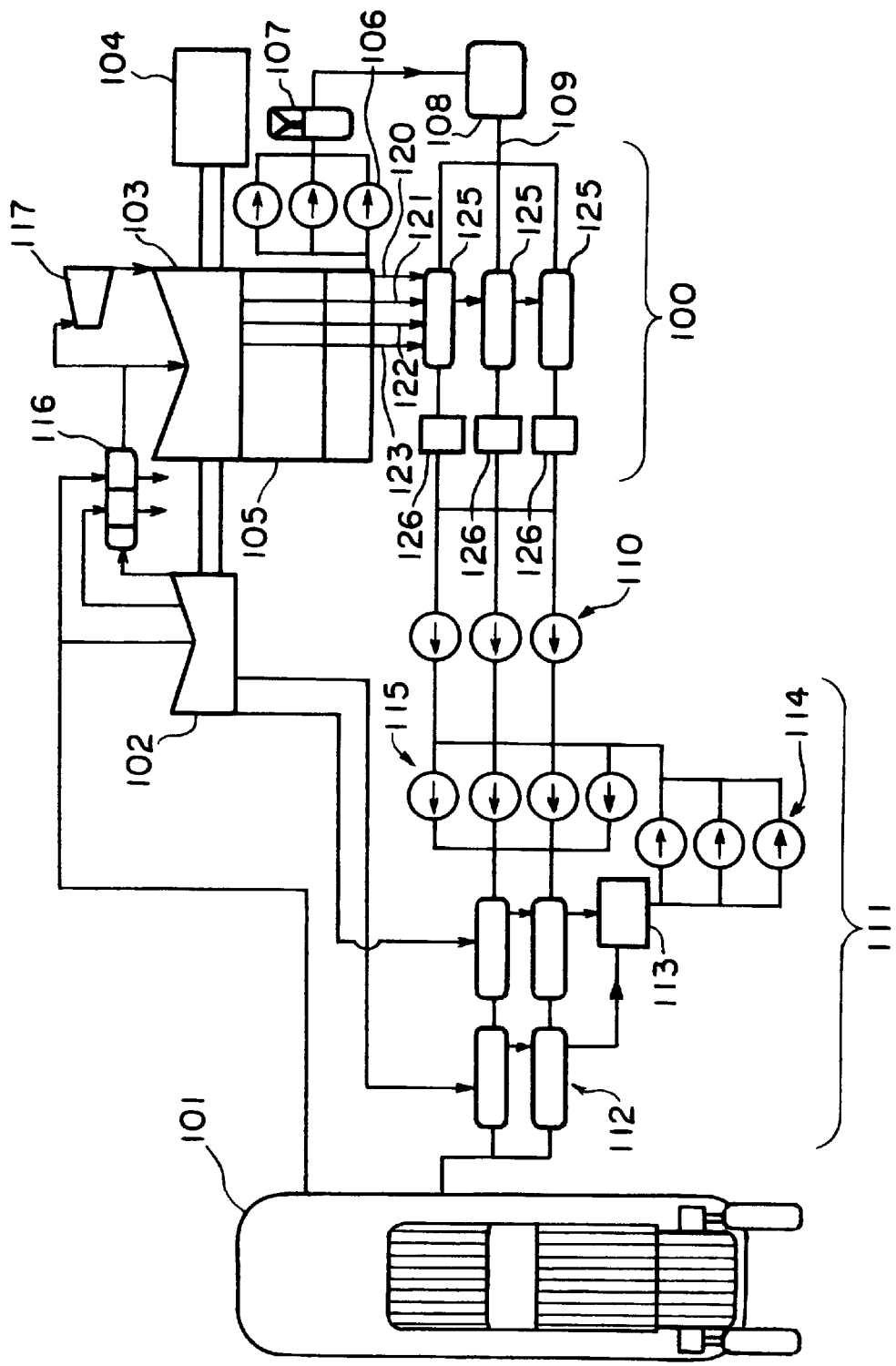
FIG. 12 is a block diagram of an advanced boiling water reactor system with a feed water heating system according to the present invention.

FIG. 12 shows a feed water heating system 100 for an advanced boiling water reactor according to the second invention of the present application.

In FIG. 12, a high-pressure steam turbine 102 and a low-pressure steam turbine 102 are driven by the steam generated by a nuclear reactor 101 to operate a generator 104 connected to the high-pressure steam turbine 102 and the low-pressure steam turbine 103. The steam, which has done work in the low-pressure steam turbine 103, is condensed by a condenser 105, and the condensate in the condenser 105 is supplied as a feed water 109 to a feed water heating system 100 via an air ejector 107 and a condensate filter/demineralizer 108 by means of a low-pressure condensate pump 106.

The feed water 109 is temperature and pressure raised by the feed water heating system 100 to be fed to a high-pressure feed water heating section 111 by means of a high-pressure condensate pump 110, so that a high-temperature and high-pressure feed water is supplied from the high-pressure feed water heating section 111 to the nuclear reactor 101. Reference number 116 denotes a moisture-content separator/heater, and reference number 117 denotes a turbine for driving reactor feed pumps 115 and so forth.

The high-pressure feed water heating section 111 comprises high-pressure feed water heaters 112, a drain tank 113, high-pressure drain pumps 114, and reactor feed pumps 115. A steam is supplied from the high-pressure steam turbine 102 to the high-pressure feed water heaters 112 to be condensed by heat exchange in the high-pressure feed water heaters 112 to be collected into the drain tank 113. The liquid in the drain tank 113 is fed to the reactor feed pumps 115 by means of the high-pressure drain pump 114. The liquid fed to the reactor feed pumps 115 is mixed with the feed water supplied via the high-pressure condensate pumps 110 to be supplied to the high-pressure feed water heaters 1 12.

The feed water heating system 100 will be described in detail below.

Figures 13A, 13B:
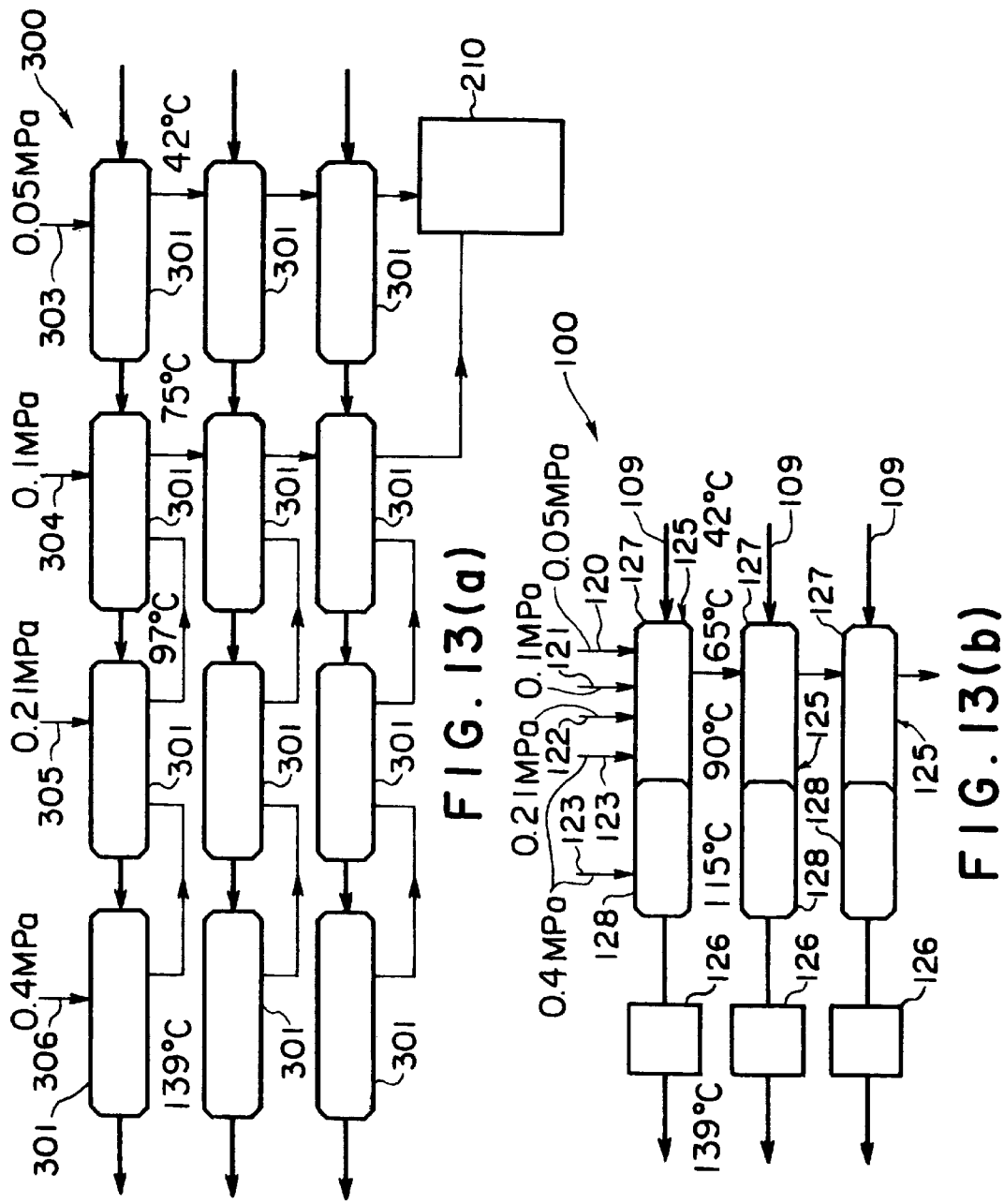
FIG. 13(a) is a diagram showing a conventional feed water heating system using heat exchanger type low-pressure feed water heaters.
FIG. 13(b) is a diagram showing a feed water heating system according to the present invention, which is substituted for the conventional feed water heating system.

As shown in FIG. 12, the feed water heating system 100 comprises: three steam injector systems 125 connected in parallel to each other; and three buffer tanks 126 connected in series to the respective steam injector systems 125 downstream thereof. As shown in FIG. 13(b), each of the steam injector systems 125 comprises: a multistage steam injector system 127, which will be described later; and a jet centrifugal deaerator system 128, which will be described later.

FIGS. 13(a) and 13(b) are diagrams showing that the feed water heating system 100 having the steam injector systems 125 can be easily replaced with a conventional feed water heating system 300 having heat exchanger type feed water heaters 301.

As shown in FIGS. 12 and 13(b), bled steams 120, 121, 122, 123 extracted from the low-pressure turbine 103 are supplied to the steam injector systems 125.

As can be seen from the comparison with FIG. 13(a), when the rated operation is carried out, the pressure of the first stage bled steam 120 is 0.05 MPa, which is equal to that of the bled steam 303, and the pressure of the second stage bled steam 121 is 0.1 MPa, which is equal to that of the bled steam 304. In addition, the pressure of the third stage bled steam 122 is 0.21 MPa, which is equal to that of the bled steam 305, and the pressure of the fourth stage bled steam 123 is 0.4 MPa, which is equal to that of the bled steam 306.

With respect to temperature, in the steam injector systems 125, the feed waters 109 of 42° C. are heated to 65° C., 90° C., 115° C. to be jetted to be discharged as feed waters of 139° C. from the buffer tanks 126 downstream of the steam injector systems 125, respectively. In addition, when the conventional heat exchanger type feed water heaters 301 are used, the feed waters of 42° C. are heated to 75° C., 97° C., 117° C., 139° C. to be discharged. Therefore, at the points that the feed waters of 42° C. are supplied and the feed water of 139° C. is discharged, the feed water heating system 100 can be replaced with the feed water heating system 300 with respect to temperature.

Figure 30:
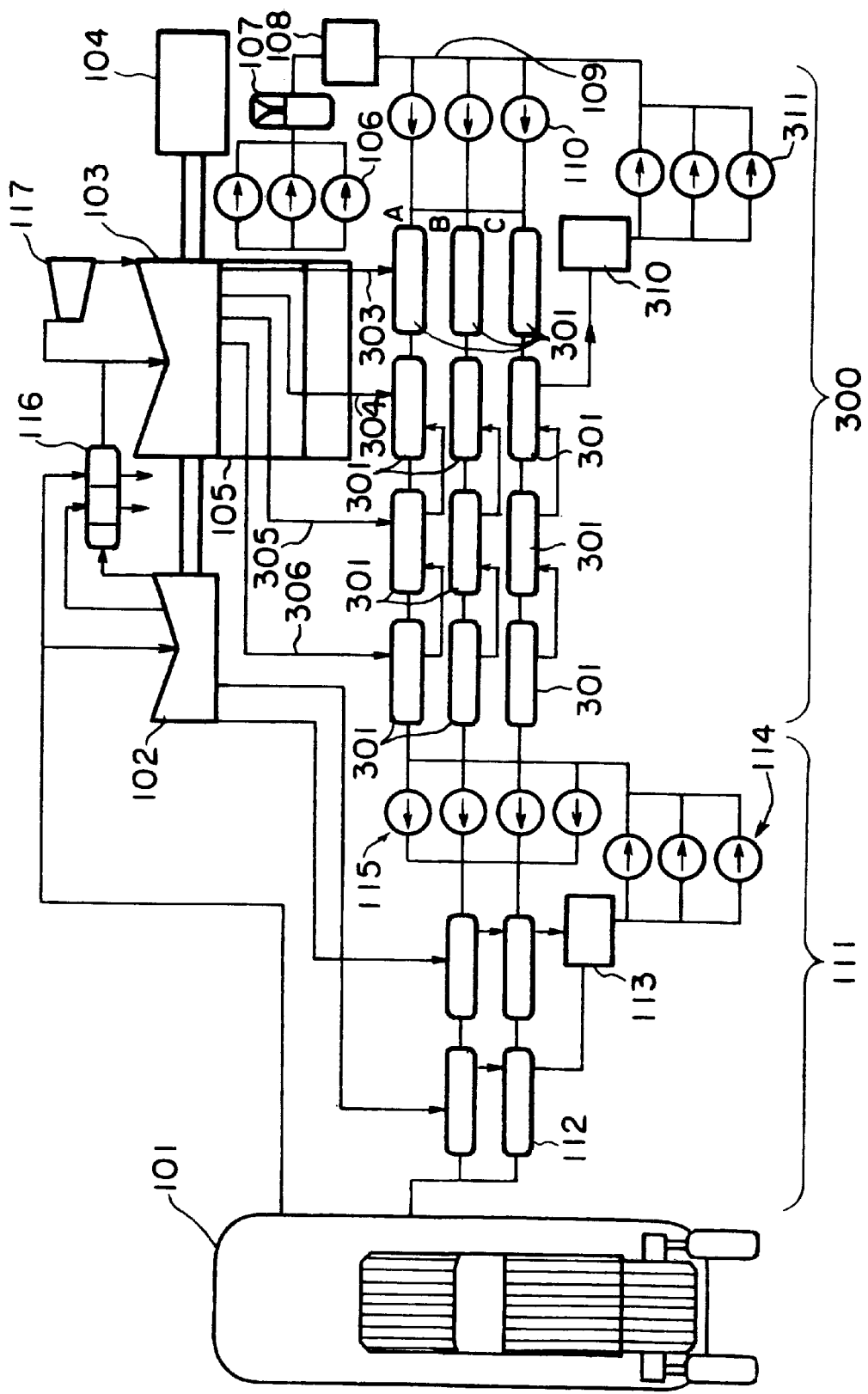
FIG. 30 is a block diagram of an advanced boiling water reactor having a conventional feed water heating system.
Figure 32:
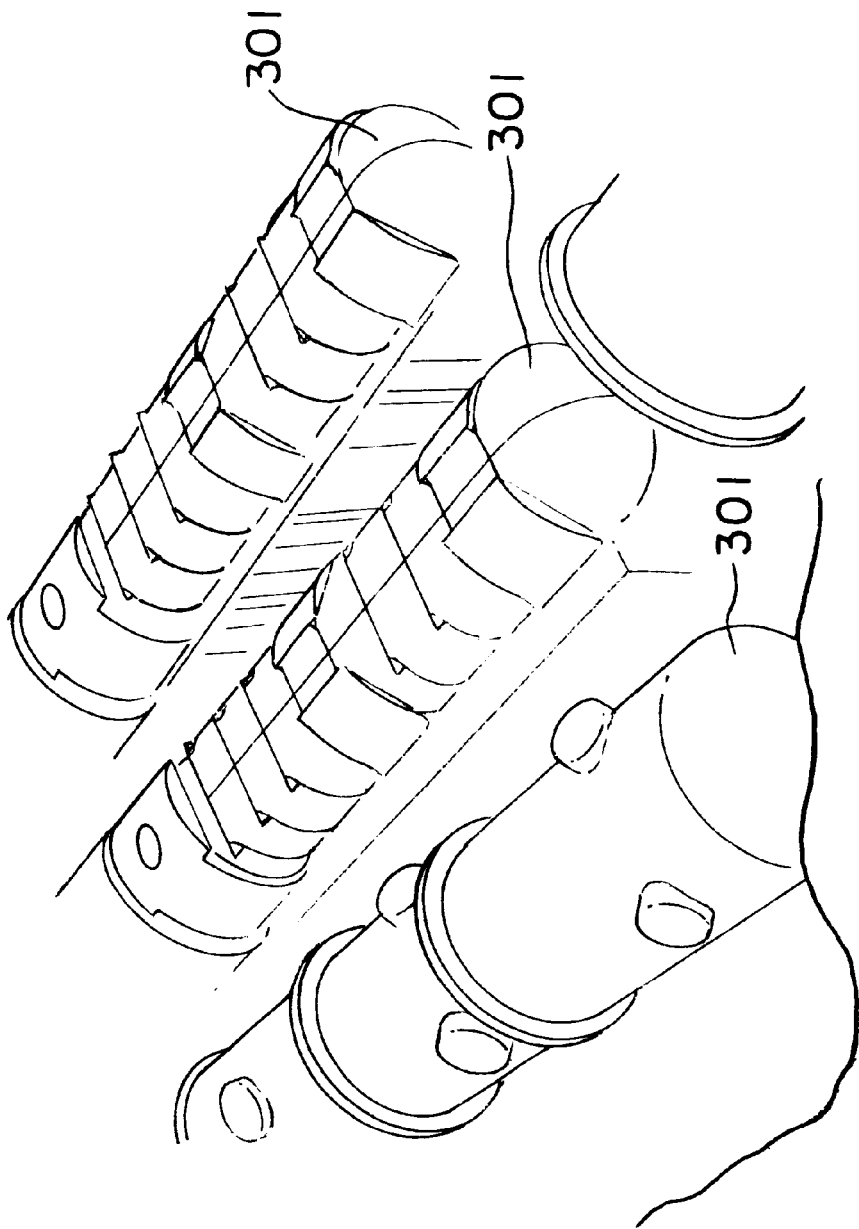
FIG. 32 is a perspective view showing that each of low-pressure feed water heaters comprises ten thousands heat-transfer pipes in a conventional feed water heating system for an advanced boiling water reactor.

Thus, since the pressures of the bled steams 120, 121, 122, 123 supplied to the steam injector systems 125 are the same as the pressures of the bled steams 303, 304, 305, 306 supplied to the conventional heat exchanger type feed water heaters 301, 301, 301, 301 shown in FIG. 30 or 13(a) when the rated operation is carried out and since the input temperature and output temperature of the feed water are the same, it is possible to easily maintain the interchangeability between the feed water heating system 100 and the conventional feed water heating system 300.

In addition, the conventional heat exchanger type feed water heaters 301, 301, 301, 301 shown in FIG. 13(a) are replaced with the steam injector systems 125 and the buffer tanks 126, which are shown in FIG. 13(b). Thus, as will be described later, it is possible to reduce the size of the turbine building by reducing the size of the system and the installation space for the system.

Figure 14:
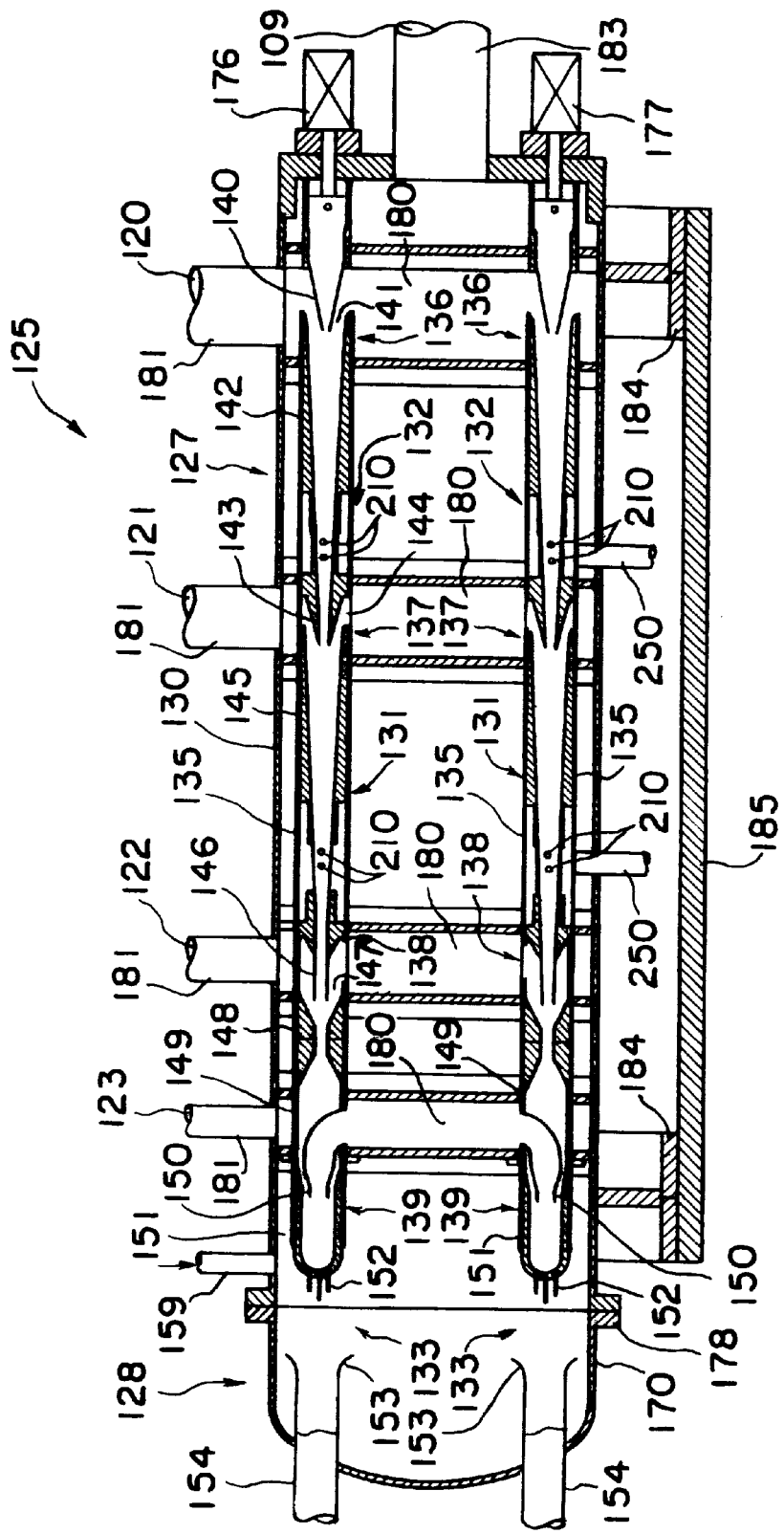
FIG. 14 is a sectional view of a steam injector system having a plurality of steam injector units.

Referring to FIG. 14, the steam injector system 125 will be described in detail below.

Figure 15:
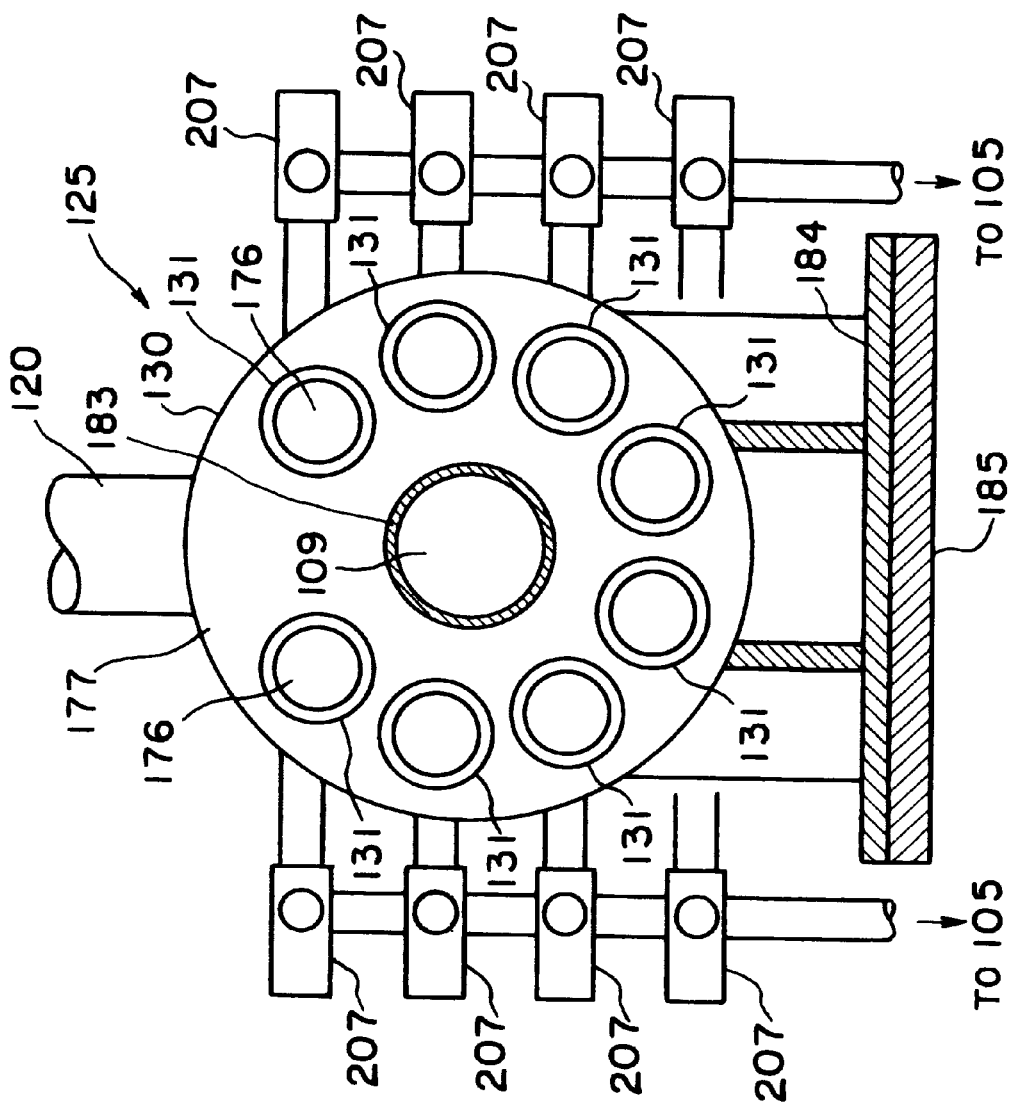
FIG. 15 is a plan view of a steam injector system having a plurality of steam injector units.

The steam injector system 125 comprises eight steam injector units 131, which are arranged in a cylindrical casing 130 at substantially regular intervals in parallel to each other as shown in FIG. 15. On the side portion of the cylindrical casing 130, inlet portions 181 for receiving the bled steams 120, 121, 122, 123 are formed. The bled steams 120, 121, 122, 123 supplied into the cylindrical casing 130 are supplied to the eight steam injector units 131 by means of lines (bled steam supply lines) 180, which extend in circumferential directions of the cylindrical casing 130. In addition, the feed water 109 (see FIG. 12) is supplied to the cylindrical casing 130 from one end thereof via a feed water nozzle 183.

The steam injector unit 131 comprises a multistage steam injector 132, and a jet centrifugal deaerator 133 connected to the downstream portion of the multistage steam injector 132.

As described above, the steam injector system 125 comprises the multistage steam injector system 127 and the jet centrifugal deaerator system 128. Therefore, the multistage steam injector system 127 comprises eight multistage steam injectors 132, and the jet centrifugal deaerator system 128 comprises eight jet centrifugal deaerators 133.

Referring to FIG. 14, the multistage steam injector 132 will be described in detail below.

The multistage steam injector 132 comprises four steam injectors 136, 137, 138, 139, which are arranged in an elongated cylindrical container 135 and which are connected in series to each other.

The steam injector 136 comprises: a water jet nozzle 140 for jetting the feed water 109 supplied via a feed water ozzle 183; a steam nozzle 141, which is formed in vicinity of the tip portion of the water jet nozzle 140 and into which the bled steam 120 is injected; and a mixing nozzle 142 for mixing water jetted from the water jet nozzle 140 with the bled steam 120 injected via the steam nozzle 141 to jet the mixture. The steam nozzle 141 is formed by the outer surface of the outlet side end portion of the water jet nozzle 140 and the inner surface of the inlet side end portion of the mixing nozzle 142. The reasons why the bled steam 120 is jetted from the outside of the feed water 109 jetted from the water jet nozzle 140 are that the pressure of the feed water 109 jetted from the water jet nozzle 140 is higher than the pressure of the bled steam 120 and that the bled steam 120 having a lower pressure is pressed against the pipe wall by arranging a fluid of a higher pressure at the center section, so that it is possible to obtain a stable fluid.

In the mixing nozzle 142, the steam nozzle 141 causes the bled steam 120 to be injected into the liquid (feed water 109) jetted from the water jet nozzle 140, so that the feed water 109 is accelerated and heated by the bled steam 120. As a result, the temperature and pressure raised liquid is jetted from the mixing nozzle 142. This temperature and pressure raised liquid is fed to the next stage steam injector 137.

To one end of the water jet nozzle 140, a nozzle driving actuator 176 is connected. The water jet nozzle 140 is moved in axial directions by means of the nozzle driving actuator 176. When the water jet nozzle 140 moves in axial directions, the space between the outer surface of the outlet side end portion of the water jet nozzle 140 and the inner surface of the inlet side end portion of the mixing nozzle 142 changes, so that the flow rate of the bled steam 120 supplied to the steam nozzle 141 is regulated.

The final stage steam injector 139 will be described below.

The steam injector 139 comprises: a water jet nozzle 149 having the same shape as that of the outlet side of the mixing nozzle 148; a central jet steam nozzle 150 for injecting the bled steam 123 into the center section formed inside of the water jet nozzle 149; and a mixing nozzle 151 for mixing water jetted from the water jet nozzle 148 with the bled steam 123 injected via the central jet steam nozzle 150 to jet the mixture. The pressure of water jetted from the water jet nozzle 149 of the steam injector 139 via the mixing nozzle 148 of the steam injector 138 upstream of the steam injector 139 is lower than the pressure of the bled steam 123. Therefore, the steam injector 139 uses the central jet steam nozzle 150 for injecting the bled steam 123 into the center section.

As described above, the steam injector 136 injects the bled steam 120 from the outside of the feed water 109 jetted from the water jet nozzle 140, whereas the steam injector 139 injects the bled steam 123 from the inside of the feed water jetted from the water jet nozzle 148.

The steam injectors 137 and 138 have the same constructions as that of the steam injector 136 at the point that the bled steams 121 and 122 are injected from the outside of the feed water jetted from the water jet nozzles 143 and 146. Furthermore, in order to allow the feed water to be temperature and pressure raised in multistage, the length and thickness of the nozzle of each of the steam injectors 136, 137 and 138 are selected so as to most efficiently raise the temperature and pressure.

As described above, since the multistage steam injector 132 has the four steam injectors 136, 137, 138 and 139 connected in series, the feed water 109 supplied to the water jet nozzle 140 via the feed water nozzle 163 is discharged from the final stage steam injector 139 as an efficiently temperature-raised and pressure-raised water.

As shown in FIG. 14, the first stage steam injector 136 and the next stage steam injector 137 are formed with drain holes 210 for discharging the excessive overflow water of the supplied feed water. The overflow water discharged from the drain holes 210 is fed to the condenser 105.

The jet centrifugal deaerator 133 will be described below.

As described above, according to the present invention, the bled steams 120, 121, 122 and 123 are directly introduced into the multistage steam injector 132 to form a feed water to be supplied to the nuclear reactor 101. Therefore, it is required to deaerate the water outputted from the multistage steam injector 132. This is achieved by the jet centrifugal deaerator 133.

The basic principle of deaeration is based on the well-known "Henry's law". The "Henry's low" is expressed by the following relational expression.

(equilibrium solubility in liquid phase)=(partial pressure of noncondensing gas in gaseous phase contacting liquid phase)/(Henry's constant)

Among the noncondensing gases contained in the bled steams 120, 121, 122 and 123 of the low-pressure turbine 103, oxygen gas causing corrosion and stress corrosion cracking (SCC) has an influence upon the water system and the equipment in the nuclear reactor. In the case of a boiling water reactor, the partial pressure of oxygen gas in the bled steams 120, 121, 122 and 123 is about 16 ppm based on the gamma-ray decomposition of water at the reactor core. Even if the noncondensing gasses are discharged into the gaseous phase by deaerating so that the concentration of the noncondensing gases is increased by 20 to be 320 ppm, the Henry's constant is a great value, about 7000, so that the solubility of the liquid phase is a very small value, 320 ppm/7000=46 ppb. According to the operation tests and studies for conventional plants, the concentration of dissolved oxygen is preferably in the range of from 25 ppb to 200 ppb. When the concentration of dissolved oxygen is lower than 25 ppb, iron becomes ions to be dissolved in the feed water, and when it exceeds 500 ppb, corrosion (so-called red rust) occurs at a location at which the flow velocity is low. The basic principle of deaeration is to transfer oxygen from a liquid phase to a gaseous phase on the basis of the "Henry's law".

However, this condition is based on the "equilibrium solubility", which is an equilibrium state achieved after infinite period of time, so that it is difficult to achieve the "equilibrium solubility" within a practical period of time without using any large systems.

In view of the foregoing, the inventors of the present invention have developed, by many processes of trial and error, the jet centrifugal deaerator 133 having a small spatial volume and a very high deaerating performance in place of a conventional spray in a tank, a conventional perforated plate called a deaerating element, and a system using a multistage V-shaped tray.

In order to achieve the "equilibrium solubility" within a practical period of time, it is required to make fine droplets of water to increase the gas-liquid interface area, and it is required to produce convection vortexes in droplets to move the water having a high concentration of dissolved oxygen at the center section of the droplets to the surface. In addition, it is also effective to fine droplets by a two-phase flow produced by boiling under reduced pressure.

In the jet centrifugal deaerator 133 described below, the feed water is injected from a deaerating injection nozzle 152 to be fine droplets, and a bled steam 123 is introduced to increase the interface area of the feed water contacting the bled steam 123. In addition, the bled steam 123 is injected into the droplets of the feed water to produce a convection vortex in the droplets to move the portion having a high concentration of dissolved oxygen at the center section of the droplets to the surface to effectively deliver dissolved oxygen. In addition, since the feed water injected from the deaerating injection nozzle 152 is boiled under reduced pressure to be a two-phase flow fluid of water and steam, the droplets of the feed water become finer droplets. Thus, the jet centrifugal deaerator 133 can achieve efficient deaeration.

Figure 25:
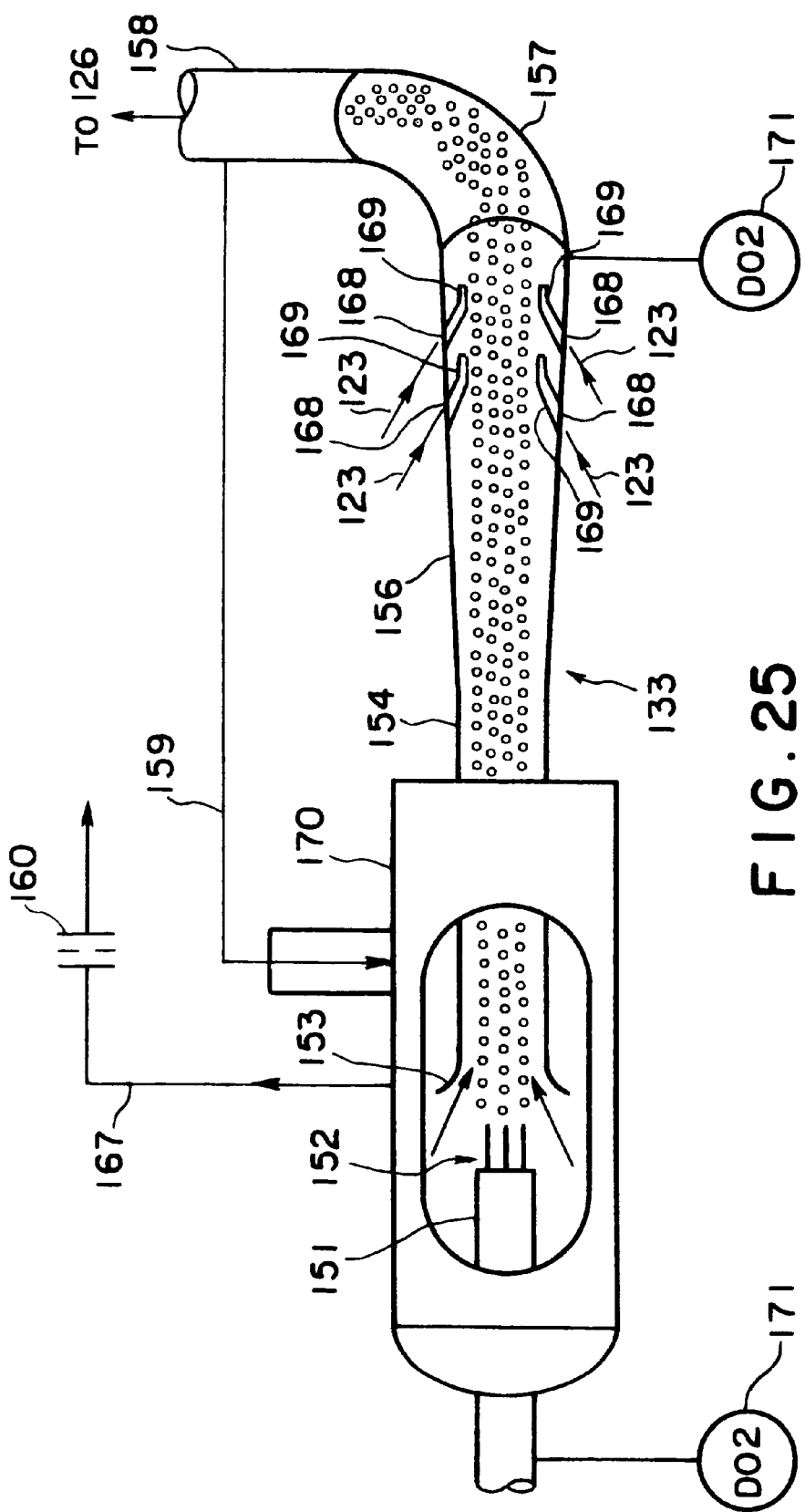
FIG. 25 is a schematic view of an example of a jet centrifugal deaerator according to the present invention.

Referring to FIG. 25, the principal structure of the jet centrifugal deaerator 133 will be described below.

The jet centrifugal deaerator 133 comprises: at least one deaerating injection nozzle 152 mounted on the outlet end of the mixing nozzle 151 of the steam injector 139; a straight pipe 154 having a bell mouth 153; a diffuser 156 connected to the straight pipe 154; a plurality of steam injection nozzles 169 for injecting a bled steam 123 downstream of the straight pipe 154 or the diffuser 156; an elbow 157 formed as a bent pipe for separating steam from liquid by centrifugal force; a recirculating steam line 159 for recirculating the steam separated by the elbow 157 to the bell mouth 153; and a bent pipe 157 for discharging the deaerated noncondensing gas into the condenser 105 or the low-pressure turbine 103 via an orifice 160.

The water separated by the elbow 157 is fed to the buffer tank 126 via a pipe 158.

The portions of the straight pipe 154 including the mixing nozzle 151, the deaerating injection nozzle 152 and the bell mouth 153 are provided in a container 170 serving as the rear end portion of the cylindrical casing 130. Each of the mixing nozzle 151 and the diffuser 156 is provided with a dissolved oxygen analyzer 171 for measuring the concentration of dissolved oxygen.

The operation of the jet centrifugal deaerator 133 will be described below.

The deaerating injection nozzle 152 converts the temperature and pressure raised feed water, which has been jetted from the mixing nozzle 151, into an aggregation of water droplets to inject the droplets into the straight pipe 168 and the diffuser 156.

Since the bell mouth 153 is formed at the front end portion of the straight pipe 154, the steam returned to the container 170 by the recirculating steam line 159, together with the water jetted from the deaerating injection nozzle 152, is collected at a low fluid resistance by the function of the bell mouth 153 to be fed into the straight pipe 168.

The steam injection nozzle 169 has a tapered angular shape. The bled steam 123 having substantially the same pressure as that of the water jetted from the mixing nozzle 151 is injected from the steam injection nozzle 169 by means of a branch pipe (not shown).

When the pressure of the steam injected from the steam injection nozzle 169 is higher than that of the water jetted from the mixing nozzle 151, the deaerating efficiency lowers in accordance with the Henry's law. When the pressure of the steam injected from the steam injection nozzle 169 is lower than that of the water jetted from the mixing nozzle 151, the bled steam is prevented from being mixed into water droplets, so that the deaerating efficiency lowers.

Furthermore, while the steam blowing port 168 of the steam injection nozzle 169 has been formed in the peripheral surface of the diffuser 156, it may be formed in the peripheral surface of the straight pipe 154. In addition, the straight pipe 154 may form a part of the diffuser 156.

Since the group of water droplets and the bled steam 123, which flow through the diffuser 156, are pressurized by the diffuser 156, the steam separated by the elbow 157 can be returned to the container 170 via the recirculating steam line 159, so that it is possible to effectively utilize the bled steam 123. In addition, since the group of water droplets and the bled steam 123, which flow through the diffuser 156, are pressurized by the diffuser 156, the water separated by the elbow 157 can be fed to the buffer tank 126 via the pipe 158.

While the mist flow of water droplet group and steam flowing through the diffuser 156 flows along the wall surface of the elbow 157 formed as a bent pipe, the mist flow receives different centrifugal forces on the basis of the difference between the respective masses to be converted into a stratified flow. As a result, the water droplet group is collected radially outwards and the steam is collected radially inwards, so that the water droplet group is separated from the steam. In addition, the group of water droplets is separated by the elbow 157 to be bonded to each other to form a water flow to be supplied to the buffer tank 126. Since the recirculating steam line 159 branches from the pipe 158 radially inside of the elbow 157, the separated steam can be efficiently returned to the container 170.

Since the deaerated noncondensing gas is discharged into the condenser 105 and so forth via the bent pipe 157, the mass balance between the deaerated noncondensing gas and the steam returned via the recirculating steam line 159 can be established in the container 170.

A plurality of deaerating injection nozzles 152 formed at the outlet end of the mixing nozzle 151 include a central nozzle 152a provided at the center section so as to extend in parallel to the axial direction of the straight pipe 154, and six peripheral nozzles 152b through 152g, which concentrically surround the central nozzle 152a and which are provided so as to be inclined at an angle of about 0 to 4 degrees. In this embodiment, while the number of the peripheral nozzles have been six, it may be three or more.

Figure 26:
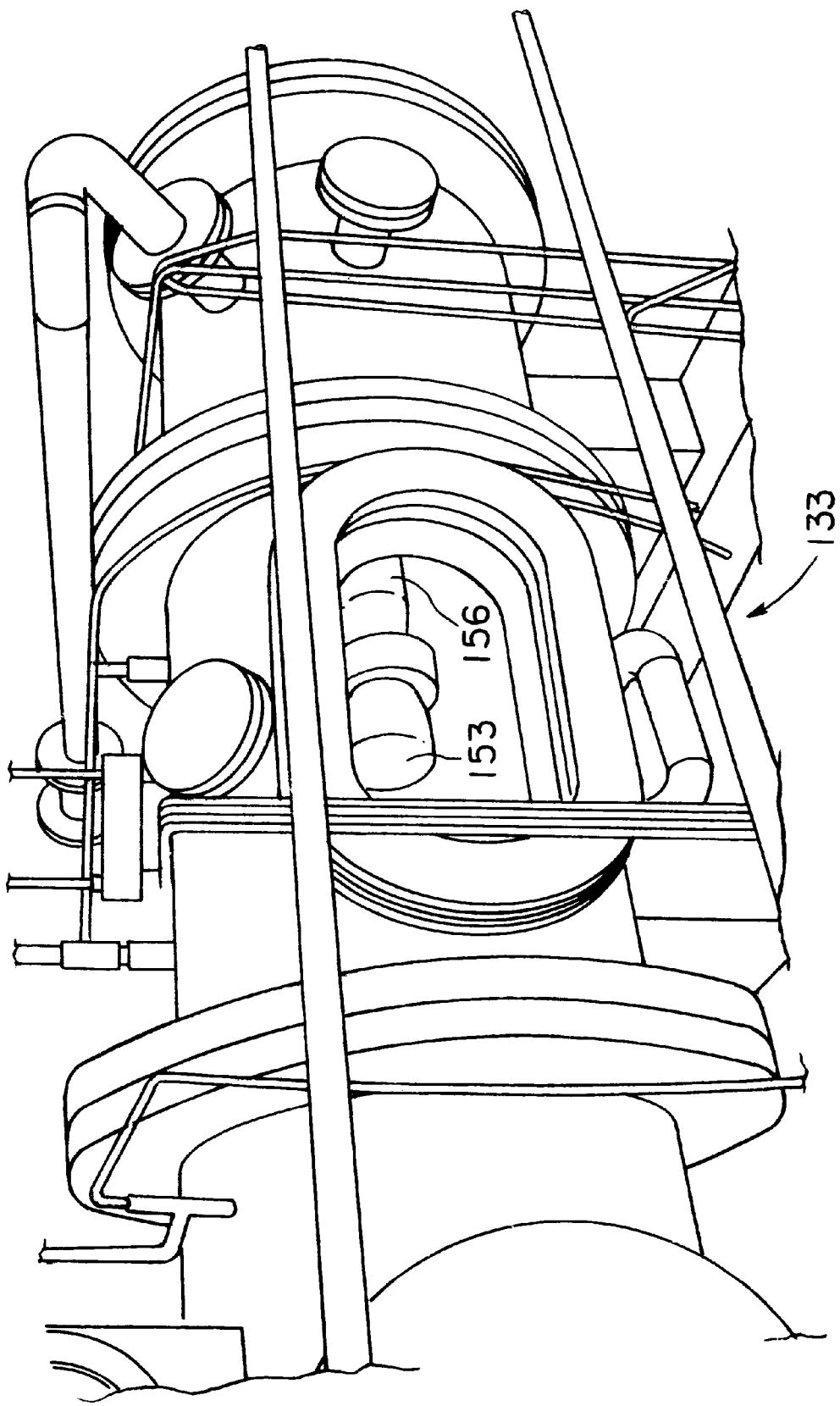
FIG. 26 is a perspective view of a part of a testing equipment of a jet centrifugal deaerator according to the present invention.

FIG. 26 is a perspective view of a part of an actual testing equipment of the jet centrifugal deaerator 133 shown in FIG. 25.

Figure 27:
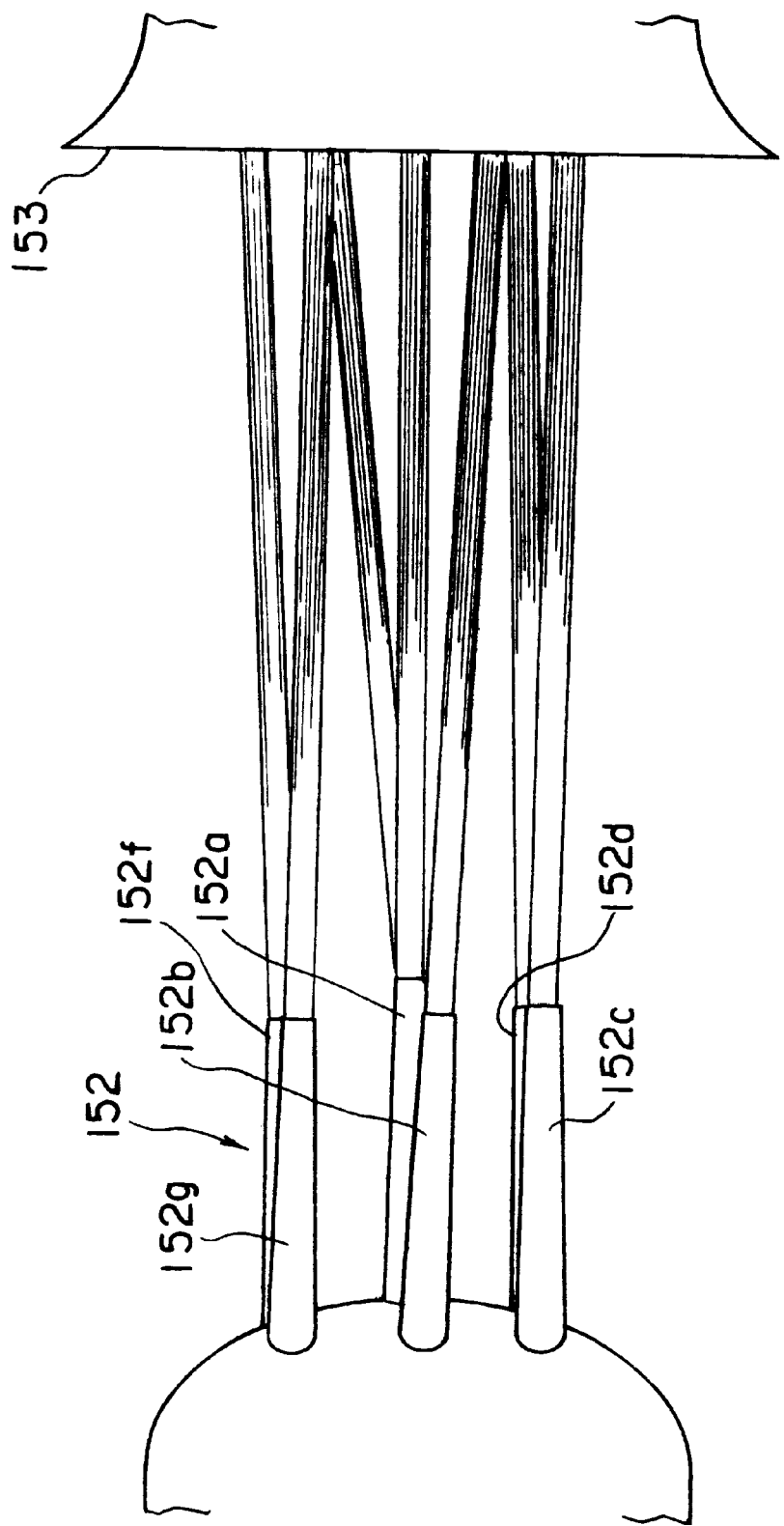
FIG. 27 is a schematic view of jet flows discharged from a deaerating injection nozzle having six peripheral nozzles.

FIG. 27 shows jet flows from the deaerating injection nozzle having six peripheral nozzles. In FIG. 26, the peripheral nozzles 152b through 152g are inclined by about 4 degrees in a circumferential direction so that swirl components are applied to the sucked steam. The swirl components are applied to the steam sucked from the bell mouth 153 by inclining the peripheral nozzles 152b through 152g, so that it is possible to minimize energy loss due to suction.

This phenomenon often appears in the natural world. For example, as a small phenomenon, there is a small spout-shaped swirl vortex produced in a drain hole of a wash stand. As a large phenomenon, there is a swirljet stream at the center section of a landing disk produced when a black hole existing in the universe sucks in interstellar matters at a light velocity. According to the present invention, the peripheral nozzles 152b through 152g are slightly inclined, so that one of basic laws of flow appearing in the natural world is positively applied to minimize energy loss due to suction.

Figure 28:
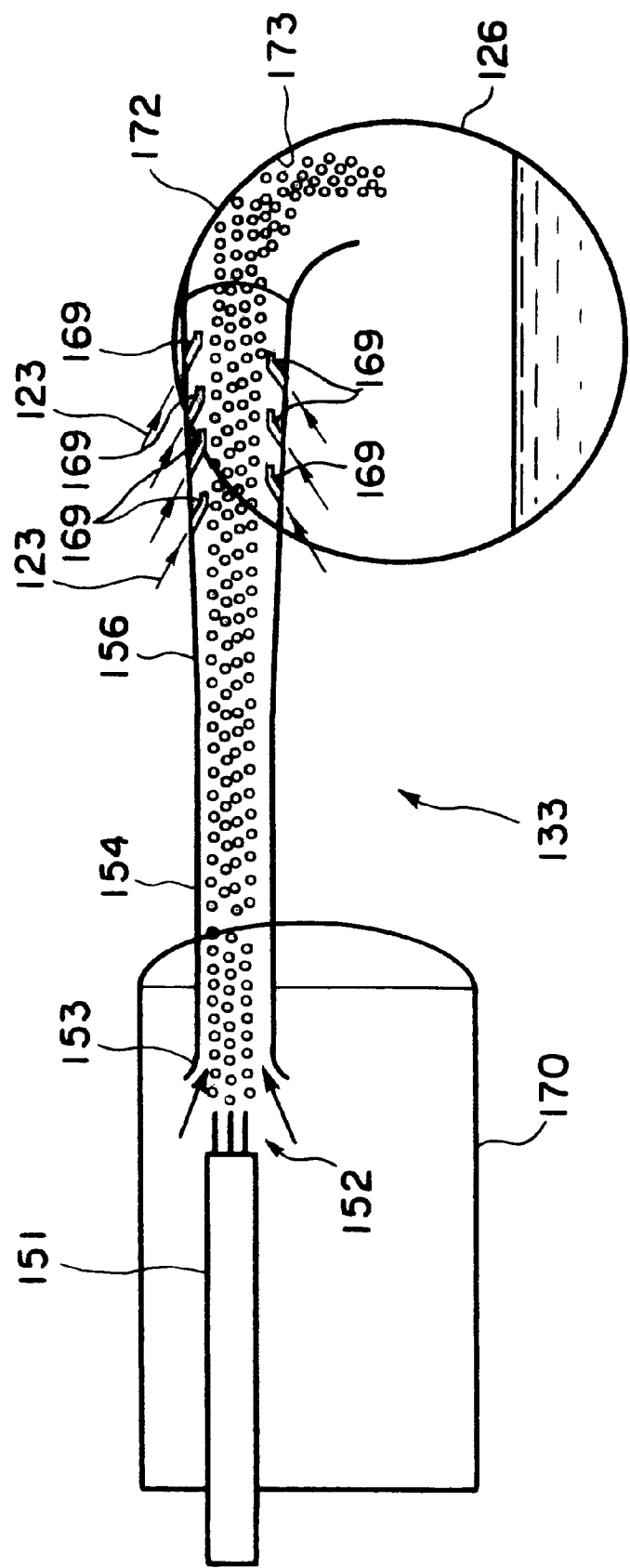
FIG. 28 is a schematic view of another example of a jet centrifugal deaerator according to the present invention.

FIG. 28 shows a buffer tank integrated jet centrifugal deaerator 133 as a modification of the jet centrifugal deaerator 133 shown in FIG. 25. In the jet centrifugal deaerator 133 of FIG. 28, the gas-liquid separation is carried out using an inner wall surface 173 of a horizontal buffer tank 126 in place of the elbow 157 of FIG. 25. An extension pipe 172 is connected to the tip of a diffuser 156, so that water droplets and steam are fed to the inner wall surface 173 of the buffer tank 126 via the extension pipe 172. As for the selection whether the gas-liquid separation is carried out by means of the elbow of FIG. 25 or the inner wall surface 173 of the buffer tank 126, a favorable way in design may be selected on the basis of the layout of the plant.

Figure 16:
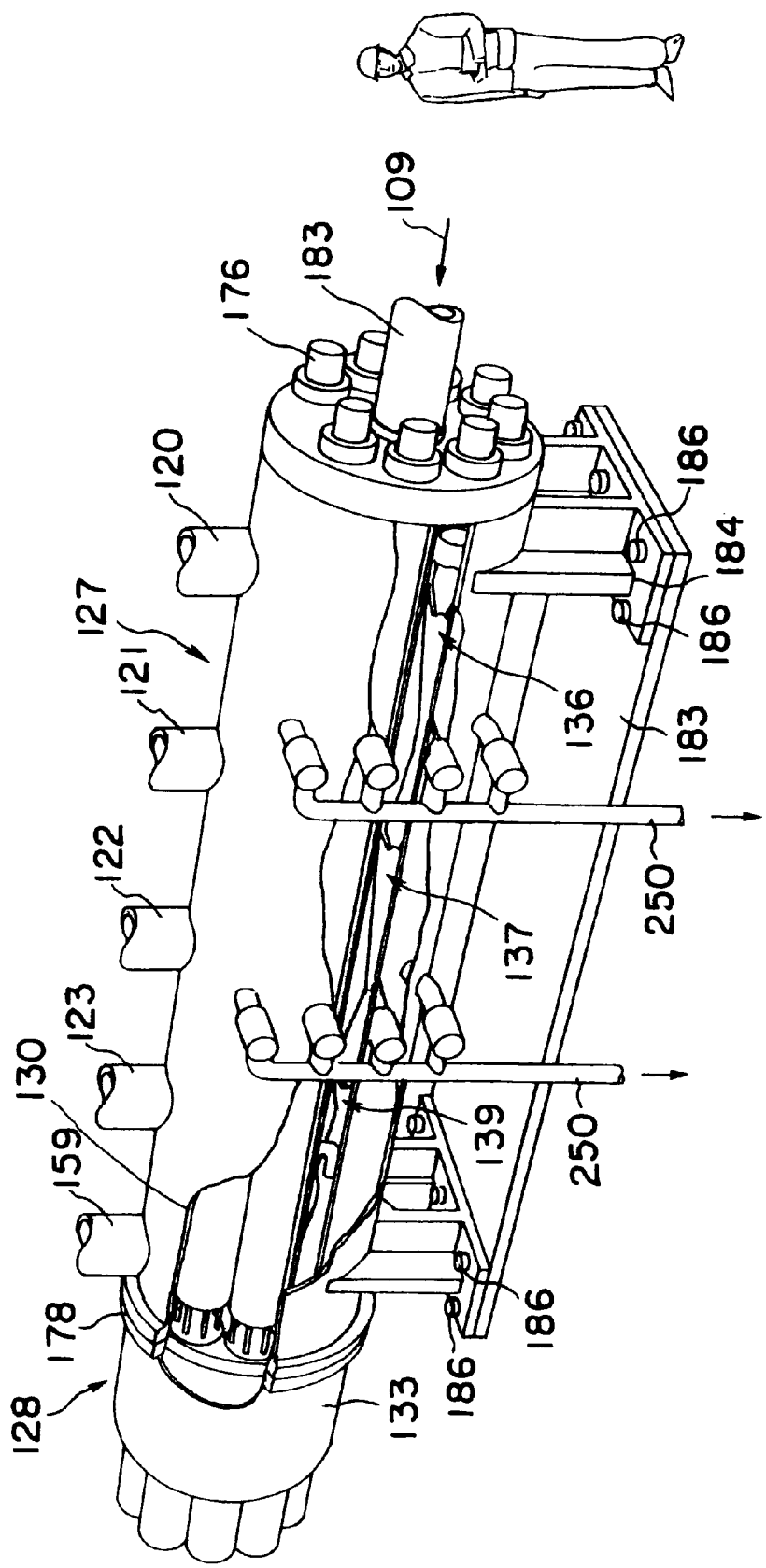
FIG. 16 is a perspective view showing the installed portion of the steam injector system and a person.

As shown in FIG. 16, the cylindrical casing 130 is horizontally installed. Rigid mounting fixtures 184 mounted on the bottom of the cylindrical casing 130 are directly fixed to a building floor 185 by means of anchor bolts 186.

On a disk-shaped lid 177 on one end face of the cylindrical casing 130, there are mounted an actuator 176 for moving the water jet nozzle 140 and so forth in axial directions and a feed water nozzle 183 for supplying the feed water 109. On the other end face of the cylindrical casing 130, a check flange 178 is provided.

Figure 17:
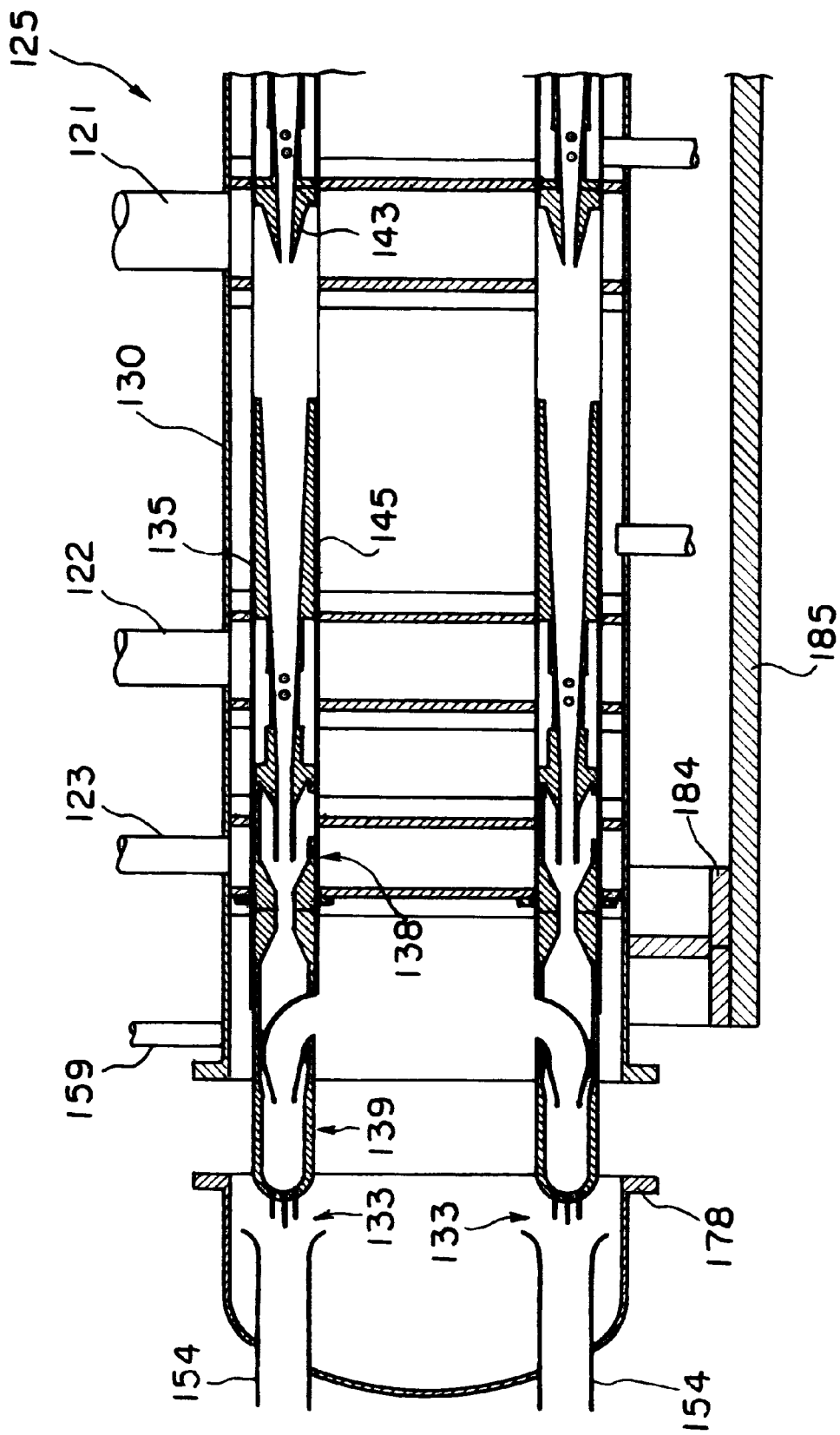
FIG. 17 is a sectional view of the steam injector system when a check flange is open.

FIG. 17 shows the state that the check flange 178 is open and that the steam injectors 136, 137, 138 and 139, can be drawn out of the cylindrical containers 135 of the respective multistage steam injectors 132 to carry out inspection and replacement.

Figure 18:
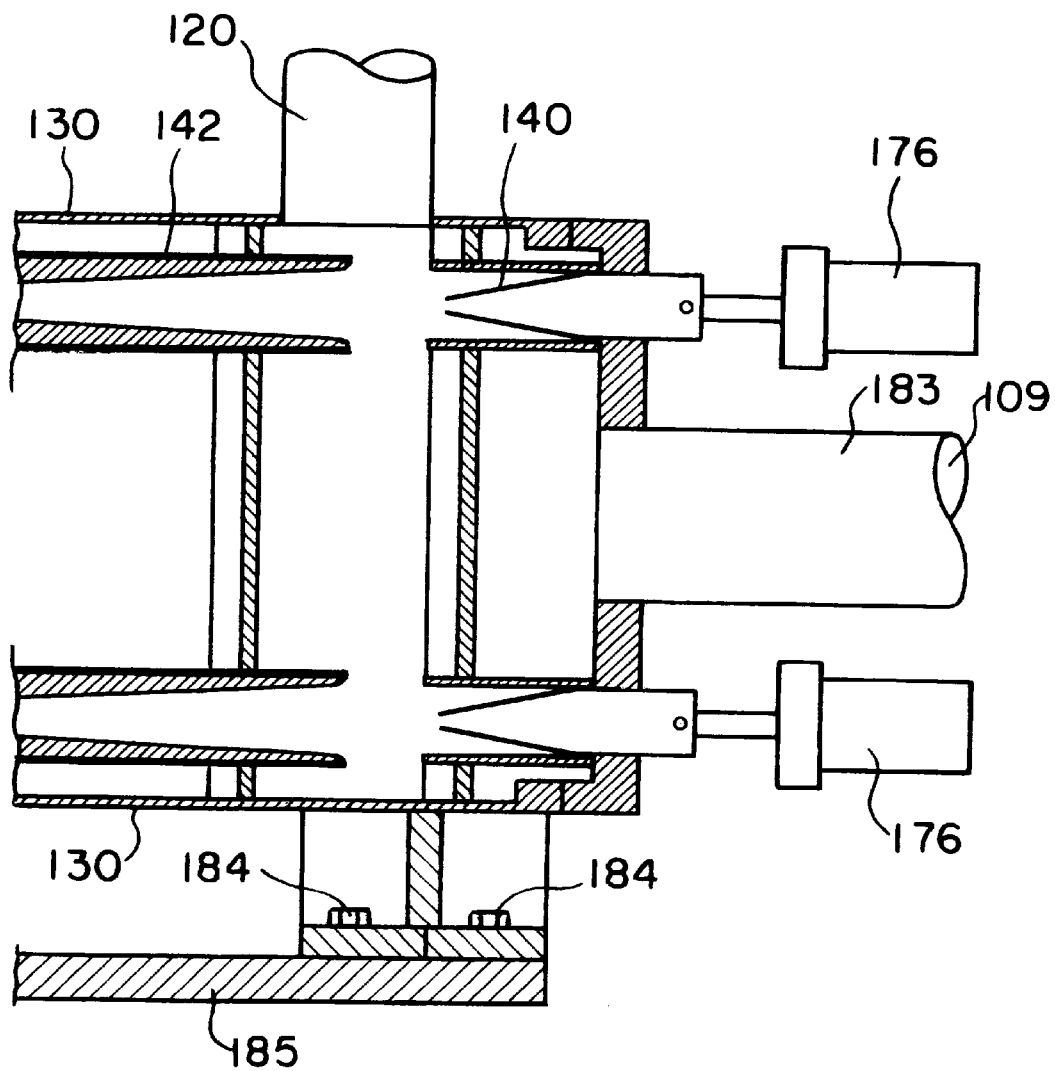
FIG. 18 is a sectional view showing that inspection and maintenance can be carried out when a water injection nozzle or an actuator is detached on the side of a lid to draw out the water injection nozzle or the actuator.

FIG. 18 shows that the water jet nozzle 140 or the actuator 176 can be detached and drawn out on the side of the lid 177 to carry out inspection and maintenance.

The bypass system 200 of the feed water heating system 100 will be described below.

Figure 19:
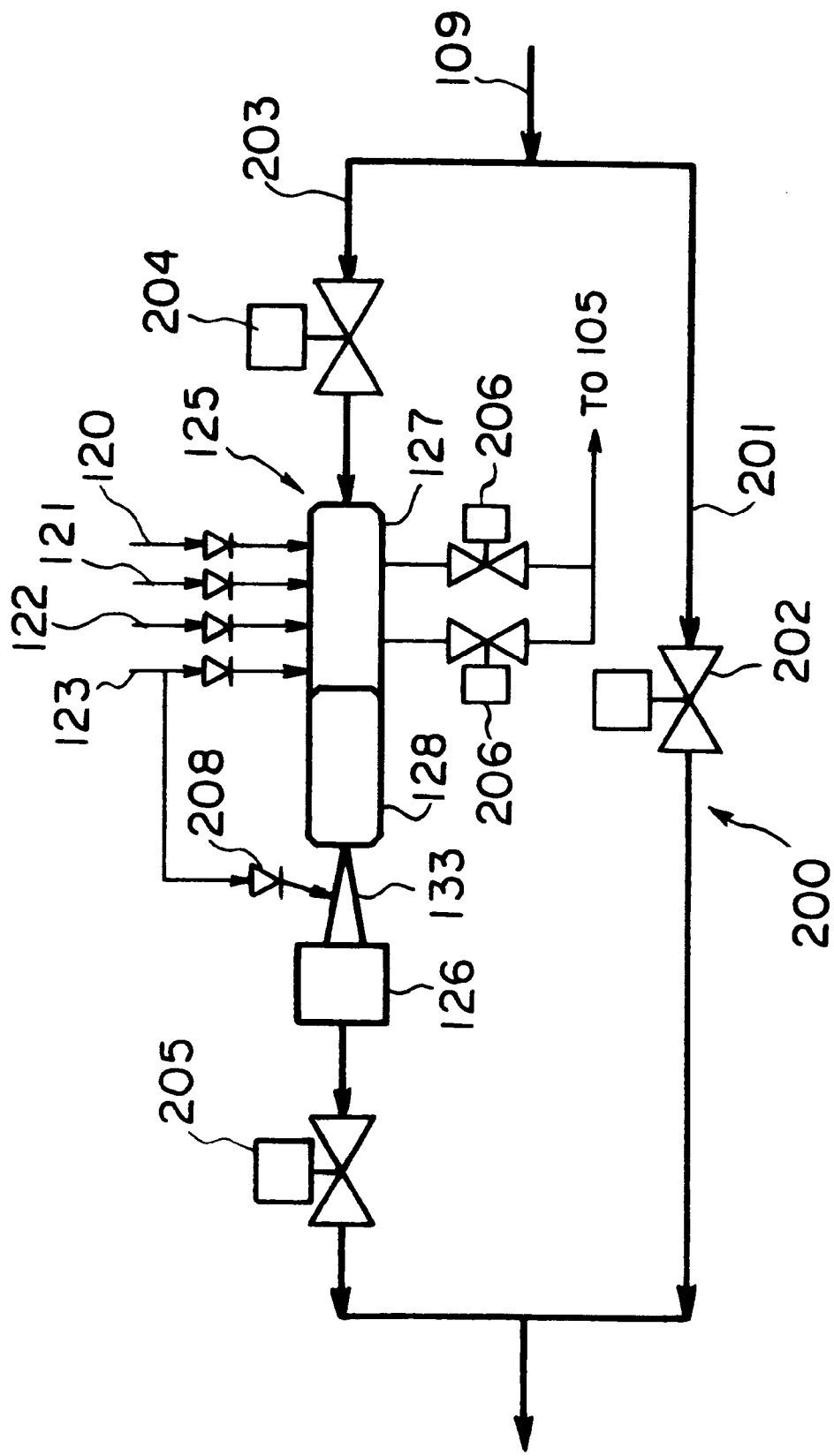
FIG. 19 is a block diagram showing a bypass line of a feed water heating system.

Since the steam injector 125 is not driven unless the bled steam 120 is supplied, it can not be driven immediately after the plant is started. FIG. 19 shows the bypass system 200 for bypassing the feed water 109 so that the steam injector 125 can be introduced into the feed water 109 when a load of about 60% is applied after the plant is started. The bypass system 200 has a line 201 for bypassing the feed water 109 and a line 203 for the steam injector system 125. The line 201 is provided with a bypass valve 202. The line 203 is provided with an isolation valve 204 upstream of the steam injector system 125, and an isolation valve 205 downstream of the buffer tank 126. When a load of about 60% is applied, if the bypass valve 202 is closed and the isolation valves 204 and 205 are open, the steam injector system 125 is introduced into the feed water 109.

As shown in FIG. 19, the bled steams 120, 121, 122 and 123 are supplied to the multistage steam injector system 127 via a check valve with actuator 207. The bled steam 123 is also supplied to the jet centrifugal deaerator 133 in the jet centrifugal deaerator system 128 via the check valve with actuator 207.

In addition, as shown in FIG. 19, the overflow water discharged from the drain holes 210 (see FIG. 14) formed in the first stage steam injector 136 and the next stage steam injector 137 is fed to the condenser 105 via an overflow relief valve with actuator 206.

Figure 20:
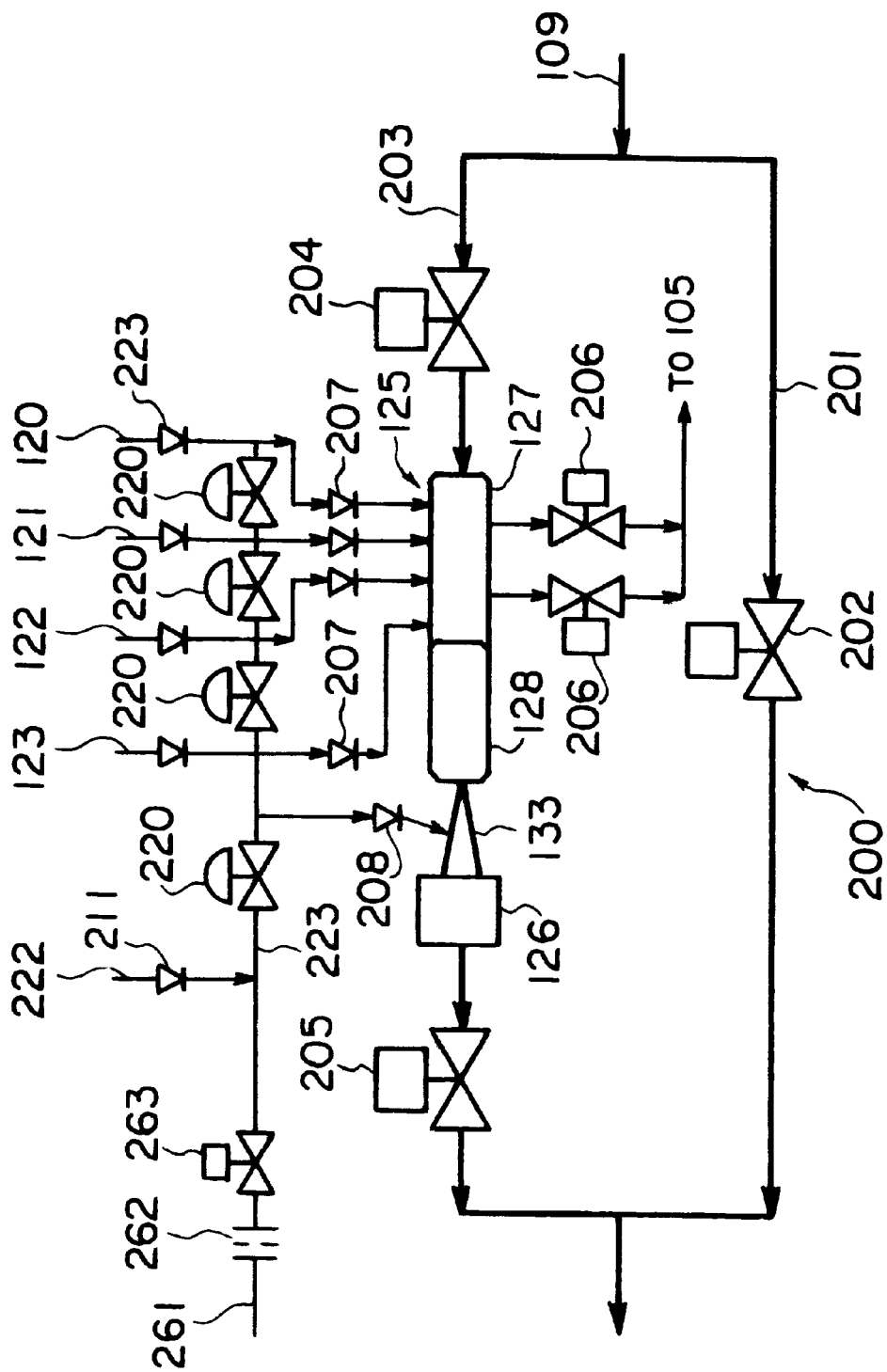
FIG. 20 is a block diagram showing that an outlet steam of a high-pressure turbine can be supplied to a steam injector system.

FIG. 20 shows that an outlet steam 222 of the high-pressure turbine 102 is utilized as a bled steam to be supplied to the steam injector system 125.

In FIG. 20, steam flow regulating valves 220 are provided between lines, to which the bled steams 120, 121, 122 and 123 are supplied. Upstream of the check valve with actuator 207, a check valve with actuator 220 is provided. The outlet steam 222 of the high-pressure turbine 102 is fed to the steam injector system 125 via a steam line 223, a check valve with actuator 221 and the steam flow regulating valve 220. If the outlet steam 222 of the high-pressure turbine 102 and the bled steam having a higher pressure at the next stage of the low-pressure turbine 103 are supplied to the steam injector system 125, it is possible to introduce the steam injector system 125 into the feed water 109 when a lower load than a load of about 60% is applied.

Figure 21:
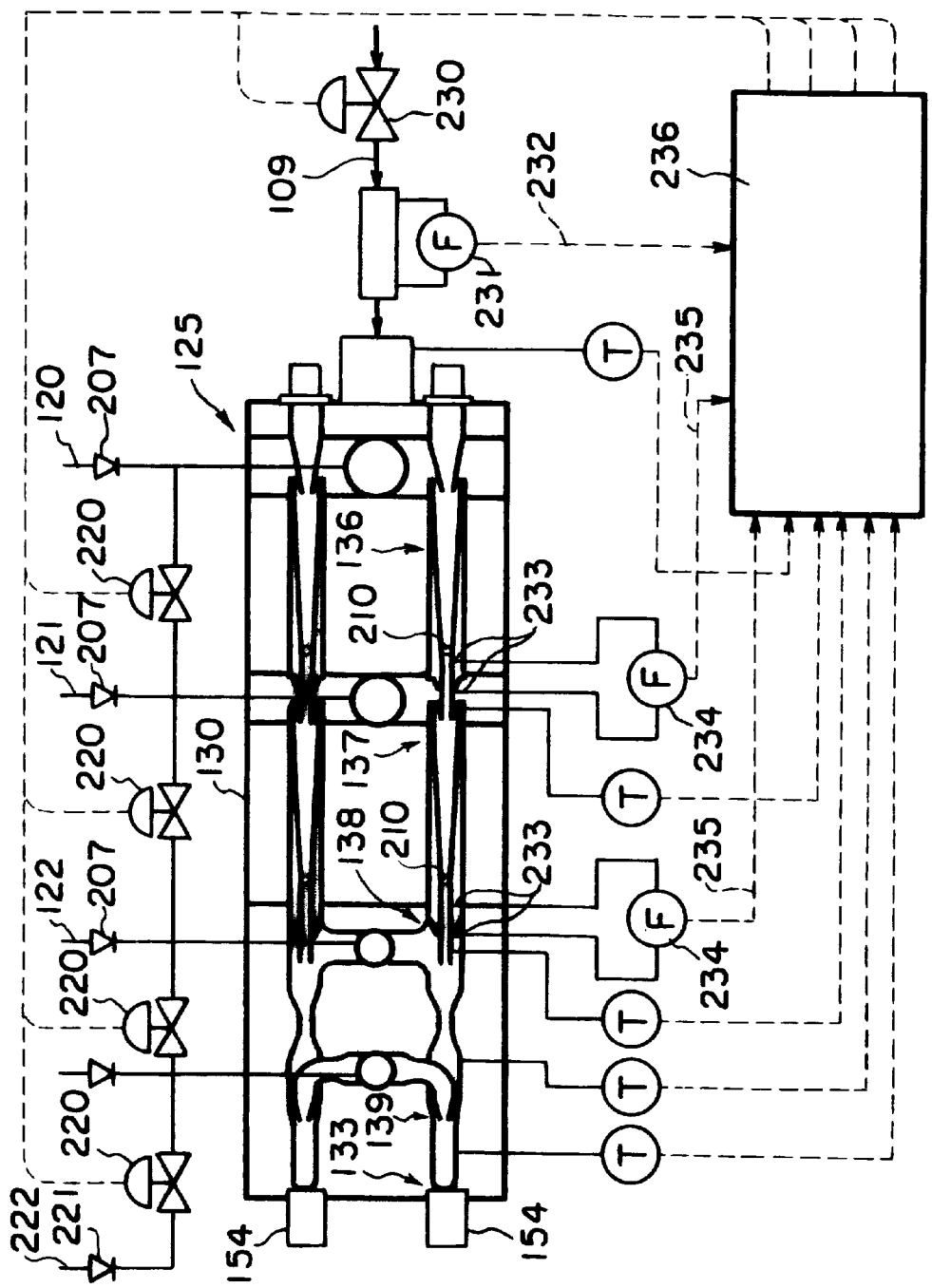
FIG. 21 is a block diagram of a control unit for minimizing the flow rate of overflow water discharged from drain holes of the first stage steam injector and the next stage steam injector.

FIG. 21 shows a control unit for minimizing the flow rate of overflow water discharged from the drain holes 210 (see FIG. 14) of the first stage steam injector 136 and the next stage steam injector 137.

In FIG. 21, a flow regulating valve 230 is provided for regulating the flow rate of the feed water 109 supplied to the steam injector system 125. The flow rate of the feed water 109 is detected as a differential pressure signal by means of a differential pressure transmitter 231 provided downstream of the flow regulating valve 230, and the detected differential pressure signal is transmitted to a flow processing unit 236. In order to measure the discharge flow rate of the temperature and pressure raised feed water discharged from each of the mixing nozzle 142 and 145 of the steam injectors 136 and 137, two differential pressure measuring holes 233 are formed in vicinity of the outlet of each of the mixing nozzles 142 and 145. The discharge flow rates from the steam injectors 136 and 137 are detected as differential pressure signals by means of differential pressure transmitters 234 via the differential pressure measuring holes 233. The reference number 232 denotes a temperature detector for measuring the temperature of the respective places to calculate the flow rate of the bled steam.

The flow processing unit 236 calculates the flow rate of the feed water and the discharge flow rate on the basis of the differential pressure signals of the differential pressure transmitters 231, 234 and 234, and derives the raised temperature on the basis of the temperatures of the respective places measured by the temperature detector 232 to calculate the flow rate of the bled steam. The flow processing unit 236 also calculates the flow rate of the overflow water discharged from the drain holes 210 on the basis of the calculated flow rate of the feed water, the calculated flow rate of the bled steam and the calculated discharge flow rate. Moreover, the flow processing unit 236 calculates the flow rate of the feed water 109 and the flow rates of steams, such as the bled steam 120 and the outlet steam 222, by means of a predetermined arithmetic expression so as to minimize the calculated flow rate of overflow water. On the basis of the calculated results, the flow processing unit 236 produces a control signal for controlling the flow regulating valve 230 and the steam flow regulating valve 220.

It is possible to improve the efficiency of the feed water heating system 100 by controlling the flow rate of the feed water 109 and the flow rates of steams, such as the bled steam 120, and by minimizing the flow rate of the overflow water.

FIG. 22 shows another means for regulating the flow rate of the feed water 109 supplied to the steam injector system 125. In the preferred embodiment of FIG. 22, the discharge pressure of the low-pressure condensate pump 106 (see FIG. 12) is controlled. In order to accomplish this, the revolving speed of the low-pressure condensate pump 106 is controlled by an inverter 238 to regulate the flow rate of the feed water 109.

Figure 23:
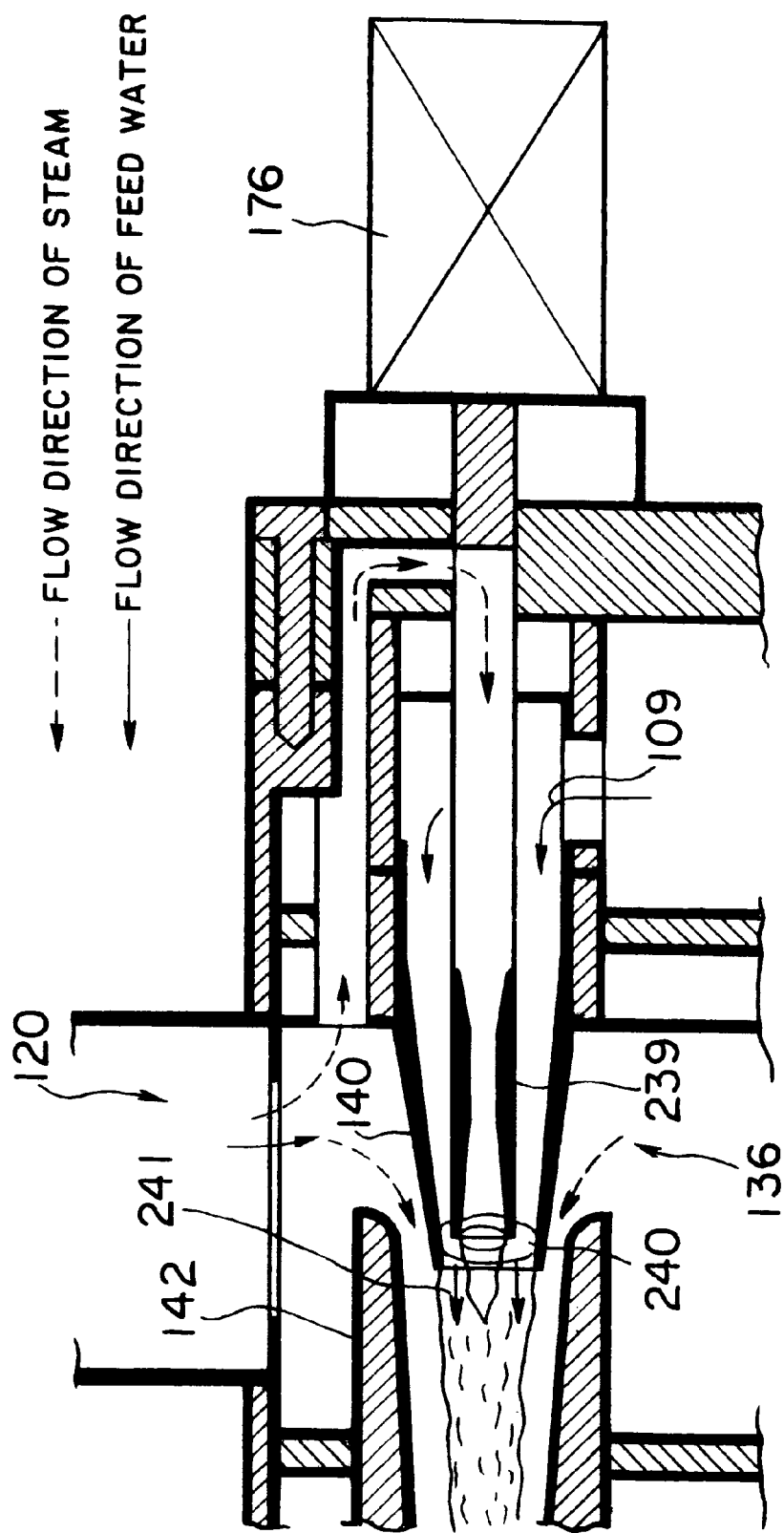
FIG. 23 is a sectional view showing an example of means for regulating the flow rate of feed water supplied to the steam injector system.

FIG. 23 shows a further means for regulating the flow rate of the feed water 109 supplied to the steam injector system 125. In the preferred embodiment of FIG. 23, a hollow regulating pipe 239, which is movable in axial directions, is provided in the water jet nozzle 140 of the steam injector 136. One end of the hollow regulating pipe 239 is connected to a nozzle driving actuator 176. The hollow regulating pipe 239 is movable in axial directions by means of the nozzle driving actuator 176. If the hollow regulating pipe 239 moves in axial directions, the space between the inner surface of the outlet side end portion of the water jet nozzle 140 and the outer surface of the outlet side end portion of the hollow regulating pipe 239 changes to regulate the flow rate of the feed water 109 supplied to the steam nozzle 141. In this case, although the structure of the steam injector 136 is slightly complicated, it is possible to maintain the jet velocity 241 of the water jet of the feed water 109 to be a high velocity. Furthermore, a part of the bled steam 120 enter the hollow regulating pipe 239 to be injected from the outlet side end portion thereof to the mixing nozzle 142. In the case of FIG. 14, the water jet nozzle 140 is moved in axial directions by means of the nozzle driving actuator 176 to regulate the flow rate of the bled steam 120. On the other hand, in the case of FIG. 23, the hollow regulating pipe 239 is moved in axial directions by means of the nozzle driving actuator 176 to regulate the flow rate of the feed water 109.

Figure 24:
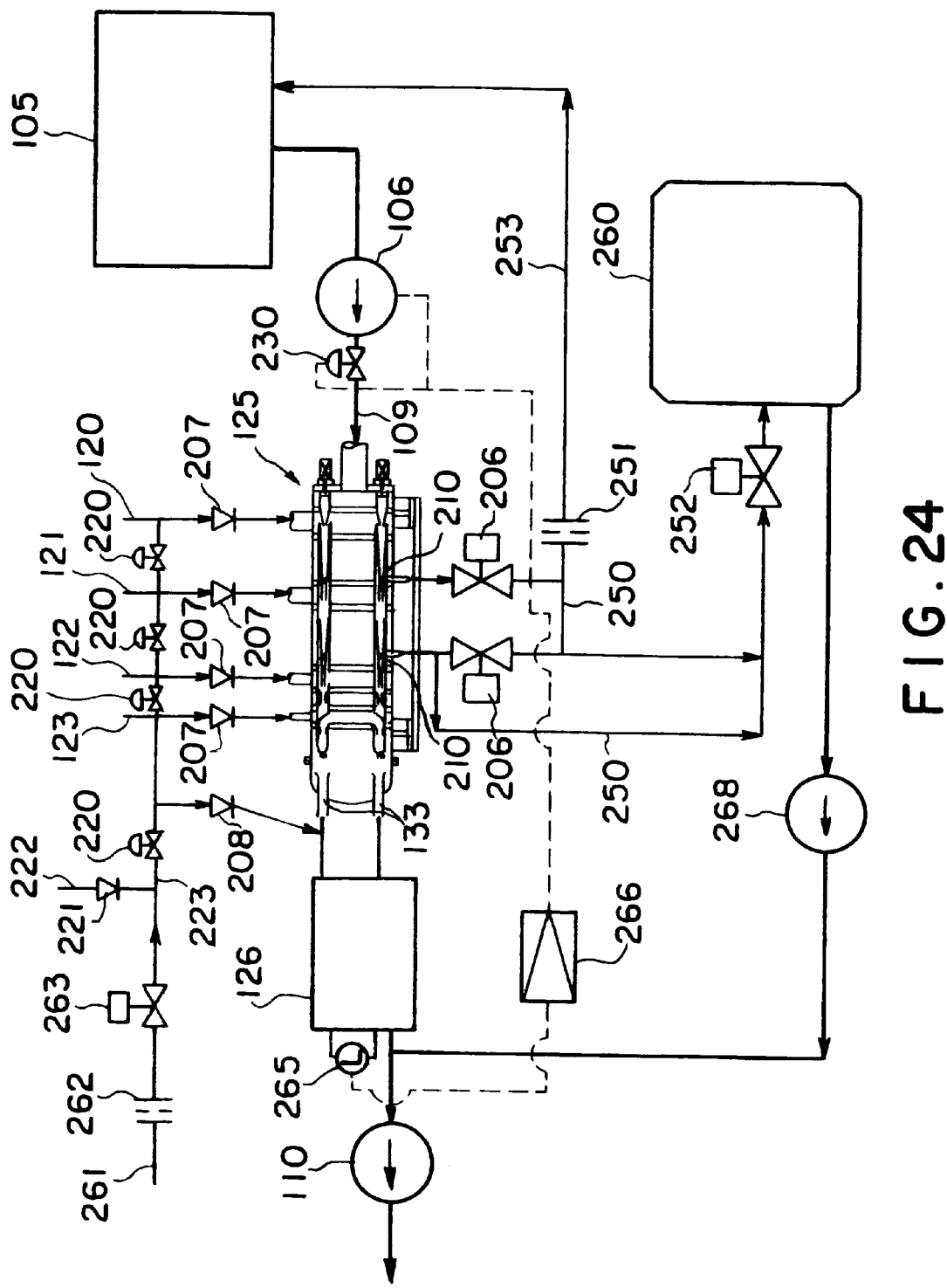
FIG. 24 is a diagram for explaining a countermeasure and an operation method during the activation and transition of the feed water heating system according to the present invention.

Referring to FIG. 24, an auxiliary deaerating means will be described below.

As a deaerating means in the feed water heating system 100, there is provided an auxiliary deaerating means comprising a deaerating line 253, in addition to the dedicated jet centrifugal deaerator 133 in the steam injector system 125. As shown in FIG. 24, the deaerating line 253 is provided in a fluid passage for returning an overflow water 250, which is discharged from the drain holes 210 formed in the steam injectors 136 and 137, to the condenser 105 or the turbine low-pressure stage via the overflow relief valve 206 and an orifice 251. The overflow water 250 to be deaerated is returned to the condenser 105 or the turbine low-pressure stage by means of the deaerating line 253 to be deaerated. Since the deaerating line 253 is thus provided, it is possible to reduce the load applied to the jet centrifugal deaerator 133.

Referring to FIG. 24, the countermeasure and operation method of the feed water heating system 100 during the start-up and transition thereof will be described.

When the plant operates at a load of 60%, the steam injector is introduced. When the steam injector system 125 is started, the overflow water 250 discharged from the drain holes 210 of the first stage steam injector 136 and the next stage steam injector 137 is discharged to the condenser 105 or a condensate storage tank 260 as shown in FIG. 24. Furthermore, the overflow water 250 is discharged to the condensate storage tank 260 via an overflow relief valve 252.

An auxiliary steam line 261 for supplying a main steam to the steam injector system 125 is connected to one branch line of the steam line 223 (see FIG. 20), to the other branch line of which the outlet steam 222 of the high-pressure turbine 102 is supplied. A check valve 263 and an orifice 262 are provided in the auxiliary steam line 261. When the turbine trip is carried out, a steam can be supplied to the steam injector system 125 via the auxiliary steam line 263 and the orifice 262. Thus, it is possible to prevent the flow rate of the steam from rapidly decreasing when the turbine trip is carried out.

As described above, the buffer tank 126 is provided downstream of the steam injector system 125, and the high-pressure condensate pump 110 is provided downstream of the buffer tank 126.

Since the steam injector system 125 can not operate when the turbine trip or the trip of the low-pressure condensate pump 106 is carried out, it is required to operate the bypass system 200 (see FIG. 19) of the feed water heating system 100 in order to ensure the supply of the feed water to the nuclear reactor 101. However, it takes a little of time until the switching to the bypass system 200 is completed.

Therefore, in order to ensure the heated feed water supplied to the nuclear reactor 101 during transition until the switching to the bypass system 200 is completed, the heated feed water stored in the buffer tank 126 is fed to the high-pressure feed water heating section 111 by means of the high-pressure condensate pump 110. Thus, it is possible to prevent the loss of the feed water supplied to the nuclear reactor 101.

As shown in FIG. 24, the feed water heating system 100 is provided with a feed water control means 266. In addition, a water gage 265 is mounted on the buffer tank 126. On the basis of the water level in the buffer tank 126 detected by the water gage 265 and a predetermined reference value, the feed water control means 266 controls the flow regulating valve 230 or the revolving speed of the low-pressure condensate pump 106 so that the water level in the buffer tank 126 is a predetermined value. Thus, it is possible to maintain the water level in the buffer tank 126 to be constant.

In addition, as shown in FIG. 24, the feed water heating system 100 is provided with a transient condensate supply pump 268. The transient condensate supply pump 268 can feed the heated feed water in the condensate storage tank 260 to the high-pressure feed water heating section 111 when the feed water supplied from the buffer tank 126 is insufficient. Thus, it is possible to prevent the loss of the feed water supplied to the nuclear reactor 101.

Figures 29A, 29B:
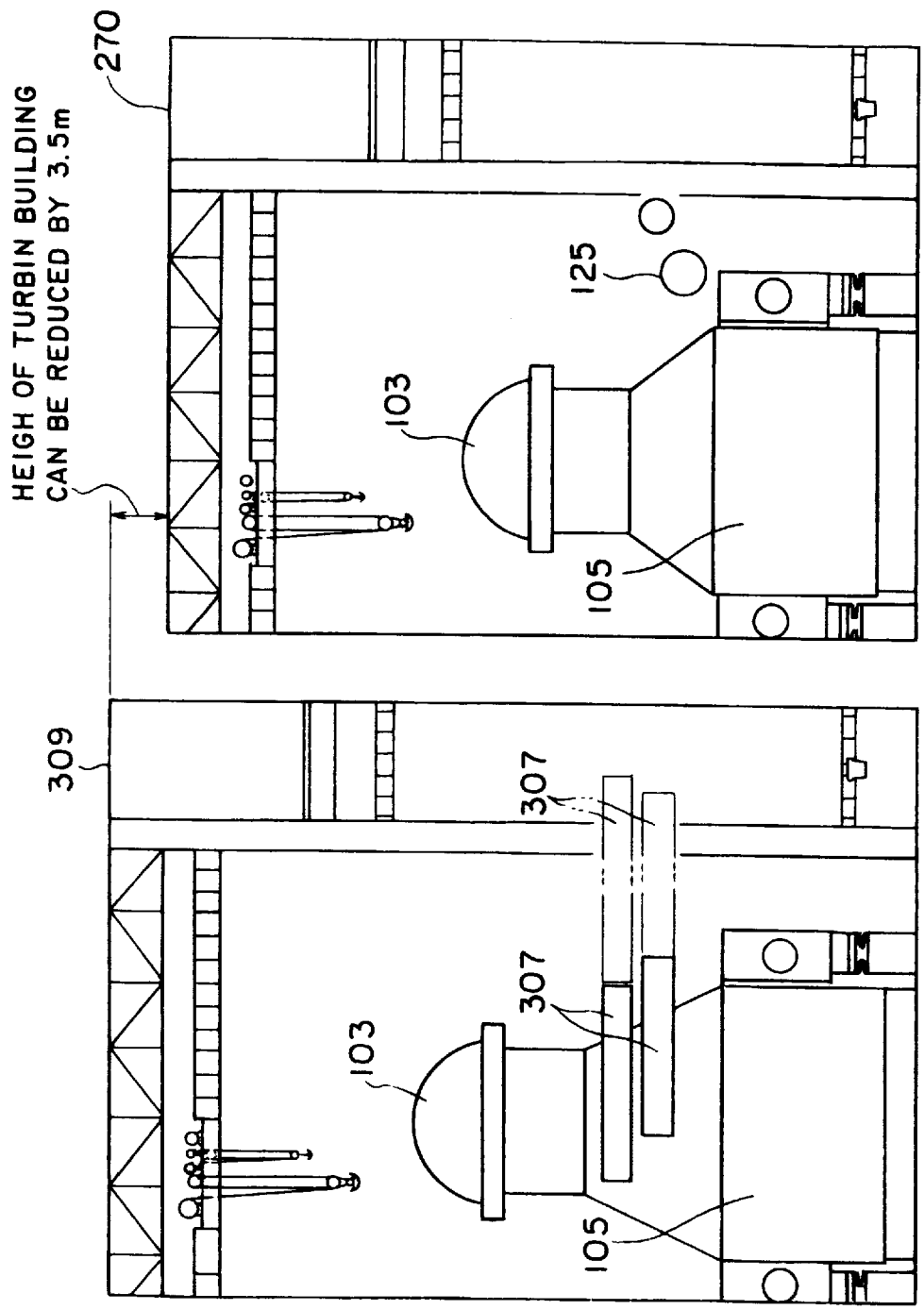
FIG. 29 is a schematic view for explaining the comparison of the size of a conventional turbine building (a) with the size of a turbine building of the present invention (b)

Referring to FIGS. 29(*a*) and 29(*b*), the execution of the feed water heating system 100 will be described below.

The present invention provides an innovative system wherein the steam injector system 125 is substituted for a conventional heat exchanger type low-pressure feed water heater 301 using a heat-transfer tube. If the outer surface of the cylindrical casing 130 of the steam injector system 125 is covered with a heat insulating material or a sound absorbing material, it is possible to reduce the leakage heat or to prevent noise generation when operated.

According to the present invention, one steam injector system 125 having a diameter of 2 m and a length of about 7 m can be substituted for four conventional low-pressure feed water heaters 301 using heat-transfer tubes, each of which has a diameter of about 2 m and a length of about 14 m. Therefore, it is possible to considerably reduce the size of the system to be about one eighth, so that it is possible to considerably reduce the quantity of materials and the installation space. As shown in FIGS. 29(*a*) and 29(*b*), the height of a turbine building 270 according to the present invention can be reduced by about 3.5 m in comparison with the height of a conventional turbine building. In addition, since the height of the low-pressure turbine 103 serving as a heavy lift provided on the condenser 105 can be reduced, it is possible to ensure safety against earthquakes.

It is undesirable to stop the plant for a long term in respect of costs in plant's life. However, since the wetted area of the stainless wall contacting the feed water can be far smaller than that in the low-pressure feed water heater 301, it is possible to prevent the elution of chromium ions. In addition, since it is possible to avoid the stop of works for a long term, a half year or more, due to the deterioration of the low-pressure feed water heater 301, it is possible to reduce the costs in plant's life.

Since the internal nozzles provided in the cylindrical casing 130, such as the water jet nozzle 140 and the mixing nozzle 142, which form the steam injector system 125, are provided so as to be capable of being easily exchanged in an ordinary inspection term even if the nozzles deteriorate, it is possible to avoid the stop of works for a long term, so that it is possible to reduce the costs in plant's life.

As described above, the feed water heating system 100 of the present invention can considerably reduce the quantity of materials of the plant while maintaining a high thermal efficiency, and considerably improve reliability, maintainability and inspection performance to improve the costs in plant's life. Therefore, this heating system is suitable for an industrial power-generating plant requiring high reliability, such as a nuclear power-generating plant, and it is possible to provide an inexpensive feed water heating system.

As described above, according to the present invention, since it is possible to simplify a feed water facility by using a steam injector for a turbine system of a power-generating plant, it is possible to improve maintainability and reliability for preventing trouble from being made by mechanical factors.

In addition, according to the present invention, it is possible to considerably reduce the quantity of materials of the power-generating plant while maintaining a high thermal efficiency, and it is possible to improve reliability, maintainability and inspection performance to considerably improve the costs in generating-plant's life, so that it is possible to provide an inexpensive industrial power-generating plant.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A feed water heating system for heating a feed water for a power-generating plant having a steam turbine, a condenser and a steam generator, said feed water heating system comprising:

a steam injector unit for receiving a plurality of bled steams having different pressures extracted from said steam turbine and an effluent water discharged from said condenser to mix said effluent water with said plurality of bled steams to raise the temperature and pressure of a mixture of said effluent water with said plurality of bled steams to deaerate and discharge the temperature and pressure raised mixture, said steam injector unit comprising:

a multistage steam injector having a plurality of steam injectors connected in series for receiving one of said plurality of bled steams and a feed water to mix said one of said plurality of bled steams with said feed water to raise the temperature and pressure of a mixture of said one of said plurality of bled steams and said feed water to discharge the temperature and pressure raised mixture;

a container for housing therein said multistage steam injector; and a jet centrifugal deaerator, provided downstream of said multistage steam injector, for receiving a feed water discharged from said multistage steam injector and said bled steams to apply a centrifugal force to said feed water and said bled steams to deaerate said feed water to spatially separate a deaerated feed water from said bled steams to discharge said deaerated feed water.

2. A feed water heating system for a power-generating plant as set forth in claim 1, wherein said multistage steam injector comprises:
   a first stage steam injector, provided at a first stage, for receiving a bled steam having a minimum pressure of said plurality of bled steams; and
   a final stage steam injector, provided at a final stage, for receiving a bled steam having a maximum pressure of said plurality of bled steams,
   said first stage steam injector comprising:
      a water jet nozzle for said first stage for receiving said effluent water to jet said effluent water;
      a steam nozzle for said first stage for receiving said bled steam of the minimum pressure from the outside of said effluent water jetted from said water jet nozzle for said first stage; and
      a mixing nozzle for said first stage for mixing said effluent water jetted from said water jet nozzle for said first stage with said bled steam having the minimum pressure received by said steam nozzle for said first stage, to jet a temperature and pressure raised feed water,
   said final stage steam injector comprising:.
      a water jet nozzle for said final stage for receiving and jetting said temperature and pressure raised feed water;
      a steam nozzle for said final stage for receiving said bled steam having the maximum pressure from the inside of said feed water jetted from said water jet nozzle for said final stage; and
      a mixing nozzle for said final stage for mixing said feed water jetted from said water jet nozzle for said final stage with said bled steam having the maximum pressure received by said steam nozzle for said final stage, to jet a temperature and pressure raised feed water.

3. A feed water heating system for a power-generating plant as set forth in claim 2, wherein said multistage steam injector further comprises at least one intermediate stage steam injector, provided between said first stage steam injector and said final stage steam injector, for receiving a bled steam having an intermediate pressure of said plurality of bled steams.

4. A feed water heating system for a power-generating plant as set forth in claim 2, herein said water jet nozzle for said first stage of said first stage steam injector is provided so as to be movable in axial directions with respect to other portions of said multistage steam injector housed in said cylindrical container.

5. A feed water heating system for a power-generating plant as set forth in claim 1, wherein a pressure of each of said plurality of bled steams is equal to a pressure of each of a plurality of bled steams supplied to a conventional feed water heating system having a heat exchanger type feed water heater.

6. A feed water heating system for a power-generating plant as set forth in claim 1, wherein said jet centrifugal deaerator comprises:
   a deaerating jet nozzle for receiving a feed water discharged from said multistage steam injector to convert said feed water into a water droplet fluid, which is as an aggregation of water drops;
   a diffuser for allowing said water droplet fluid and said bled steam to pass therethrough to deaerate said water droplet fluid by means of said bled steam to raise the pressure of said deaerated water droplet fluid and said bled steam to discharge said deaerated water droplet fluid and said bled steam; and
   centrifugal force separating means for applying a centrifugal force to a mixture of water and steam comprising said water droplet fluid and said bled steam, which have been discharged from said diffuser, to spatially separate water from steam.

7. A feed water heating system for a power-generating plant as set forth in claim 6, wherein said deaerating jet nozzle is provided so as to project from a tip portion of said cylindrical container.

8. A feed water heating system for a power-generating plant as set forth in claim 7, wherein said container is a cylindrical container, and wherein said deaerating jet nozzle comprises:
   a center nozzle projecting from the center of said tip portion of said cylindrical container in an axial direction of said cylindrical container; and
   peripheral nozzles, which are located so as to surround said center nozzle and which project so as to be inclined with respect to said axial direction of said cylindrical container.

9. A feed water heating system for a power-generating plant as set forth in claim 6, wherein said diffuser has a cylindrical straight pipe in vicinity of said deaerating jet nozzle, and a bell mouth at an inlet of said straight pipe.

10. A feed water heating system for a power-generating plant as set forth in claim 6, wherein said centrifugal force separating means has an elbow-shaped bent pipe, which is formed so that a mixture of water and steam comprising said water droplet fluid and said bled steam flows along an inner wall surface of said bent pipe.

11. A feed water heating system for a power-generating plant as set forth in claim 6, wherein said jet centrifugal deaerator comprises:
   a recirculating line for returning said steam spatially separated by said centrifugal force separating means to an inlet side of said diffuser; and
   a bent pipe for discharging a deaerated steam containing a noncondensing gas to said condenser or a turbine low-pressure stage.

12. A feed water heating system for a power-generating plant as set forth in claim 1, wherein said bled steam inputted to said jet centrifugal deaerator is a bled steam having a maximum pressure of said plurality of bled steams.

13. A feed water heating system for a power-generating plant as set forth in claim 6, wherein said jet centrifugal deaerator has a steam jet nozzle for inputting said bled steam into said diffuser, said steam jet nozzle being mounted on a side wall of said diffuser, and an outlet direction of said stem jet nozzle being an axial direction of said diffuser.

14. A feed water heating system for heating a feed water a power-generating plant having a steam turbine, a condenser and a steam generator, said feed water heating system comprising:
   a steam injector system for receiving a plurality of bled steams having different pressures extracted from said steam turbine and an effluent water discharged from said condenser to mix said effluent water with said plurality of bled steams to raise the temperature and pressure of a mixture of said effluent water with said plurality of bled steams to deaerate and discharge the temperature and pressure raised mixture, said steam injector system comprising:
a cylindrical casing;
a plurality of steam injector units provided in said casing in parallel to each other; and
a bled steam supply line, provided in said casing, for supplying a plurality of bled steams having different pressures extracted from said steam turbine to each of said plurality of steam injector units,
each of said steam injector units comprising:
a multistage steam injector having a plurality of steam injectors connected in series for receiving one of said plurality of bled steams and a feed water to mix said one of said plurality of bled steams with said feed water to raise the temperature and pressure of a mixture of said one of said plurality of bled steams and said feed water to discharge the temperature and pressure raised mixture;
a cylindrical container for housing therein said multistage steam injector; and
a jet centrifugal deaerator, provided downstream of said multistage steam injector, for receiving a feed water discharged from said multistage steam injector and said bled steams to apply a centrifugal force to said feed water and said bled steams to deaerate said feed water to spatially separate a deaerated feed water from said bled steams to discharge said deaerated feed water.

15. A feed water heating system for a power-generating plant as set forth in claim 14, wherein said multistage steam injector comprises:
a first stage steam injector, provided at a first stage, for receiving a bled steam having a minimum pressure of said plurality of bled steams; and
a final stage steam injector, provided at a final stage, for receiving a bled steam having a maximum pressure of said plurality of bled steams,
said first stage steam injector comprising:
a water jet nozzle for said first stage for receiving said effluent water to jet said effluent water;
a steam nozzle for said first stage for receiving said bled steam of the minimum pressure from the outside of said effluent water jetted from said water jet nozzle for said first stage; and
a mixing nozzle for said first stage for mixing said effluent water jetted from said water jet nozzle for said first stage with said bled steam having the minimum pressure received by said steam nozzle for said first stage, to jet a temperature and pressure raised feed water,
said final stage steam injector comprising:
a water jet nozzle for said final stage for receiving and jetting said temperature and pressure raised feed water;
a steam nozzle for said final stage for receiving said bled steam having the maximum pressure from the inside of said feed water jetted from said water jet nozzle for said final stage; and
a mixing nozzle for said final stage for mixing said feed water jetted from said water jet nozzle for said final stage with said bled steam having the maximum pressure received by said steam nozzle for said final stage, to jet a temperature and pressure raised feed water.

16. A feed water heating system for a power-generating plant as set forth in claim 14, wherein said jet centrifugal deaerator comprises:
a deaerating jet nozzle for receiving a feed water discharged from said multistage steam injector to convert said feed water into a water droplet fluid, which is as an aggregation of water drops;
a diffuser for allowing said water droplet fluid and said bled steam to pass therethrough to deaerate said water droplet fluid by means of said bled steam to raise the pressure of said deaerated water droplet fluid and said bled steam to discharge said deaerated water droplet fluid and said bled steam; and
centrifugal force separating means for applying a centrifugal force to a mixture of water and steam comprising said water droplet fluid and said bled steam, which have been discharged from said diffuser, to spatially separate water from steam.

17. A feed water heating system for a power-generating plant as set forth in claim 15, therein said casing has a detachable inlet-side lid, on which a supply nozzle and a nozzle driving actuator are mounted,
said supply nozzle supplying said effluent water to said steam injector unit, and
said nozzle driving actuator moving said water jet nozzle for said first stage of said first stage steam injector in axial directions with respect to said mixing nozzle for said first stage of said first stage steam injector housed in said cylindrical container.

18. A feed water heating system for a power-generating plant as set forth in claim 16, wherein said casing has a detachable outlet-side lid, on which said diffuser of said jet centrifugal deaerator is mounted, and an outlet side of said diffuser projecting from said outlet-side lid.

19. A feed water heating system for a power-generating plant as set forth in claim 14, wherein said casing has a detachable outlet-side lid, and said multistage steam injector housed in said cylindrical container is capable of being drawn out of said casing while said outlet-side lid is detached.

20. A feed water heating system for a power-generating plant as set forth in claim 16, wherein said casing has a closed container portion forming a part of an outlet side thereof, said deaerating jet nozzle being located in said container portion,
an inlet-side portion of said diffuser being located in said container portion so as to be spaced from a tip portion of said deaerator jet nozzle,
said jet centrifugal deaerator having a recirculating steam line for returning said steam spatially separated by said centrifugal separating means to said container portion.

21. A feed water heating system for a power-generating plant as set forth in claim 14, which further comprises a buffer tank for storing al feed water deaerated and discharged from said plurality of steam injector units,
said water stored in said buffer tank being supplied to said steam generator via a high-pressure condensate pump.

22. A feed waterheating system for a power-generating plant as set forth in claim 16, which further comprises a buffer tank for storing a feed water deaerated and discharged from said plurality of steam injector units,
said centrifugal separating means being formed on an inner wall surface of said buffer tank.

23. A feed water heating system for a power-generating plant as set forth in claim 14, which further comprises bypass feed water means for supplying a feed water to said steam generator when said steam injector system is inoperative.

24. A feed water heating system for a power-generating plant as set forth in claim 14, which further comprises introduction control means for introducing said steam injector system into a feed water system when a load of said power-generating plant reaches a predetermined load after said power-generating plant is started.

25. A feed water heating system for a power-generating plant as set forth in claim 24, wherein said introduction control means has means for introducing, as said plurality of bled steams, bled steams of a high-pressure turbine into said steam injector system via a flow regulating valve, thereby introducing said steam injector system into said feed water system when said power-generating plant operates at a lower load than said predetermined load.

26. A feed water heating system for a power-generating plant as set forth in claim 24, which further comprises overflow water flow control means for minimizing a overflow water flow rate corresponding to a difference between a sum of a feed water flow rate of a feed water supplied to said multistage steam injector and a steam flow rate of said bled steam supplied to said multistage steam injector and a discharge flow rate of an effluent water.

27. A feed water heating system for a power-generating plant as set forth in claim 26, wherein said overflow water flow control means comprises:

means for measuring said feed water flow rate;

means for measuring said steam flow rate;

means for measuring said discharge flow rate;

overflow water flow calculating means for calculating said overflow water flow rate on the basis of results derived by said means for measuring said feed water flow rate, means for measuring said steam flow rate, and means for measuring said discharge flow rate; and regulating means for regulating said feed water flow rate and said steam flow rate on the basis of a result of said overflow water flow calculating means.

28. A feed water heating system for a power-generating plant as set forth in claim 14, which further comprises feed water flow regulating means for regulating a feed water flow rate of a feed water supplied to said multistage steam injector, said feed water regulating means having means for controlling a revolving speed of a low-pressure condensate pump provided upstream of said steam injector system.

29. A feed water heating system for a power-generating plant as set forth in claim 14, which further comprises feed water flow regulating means for regulating a feed water flow rate of a feed water supplied to said multistage steam injector, said feed water regulating means having a flow regulating valve provided upstream of said steam injector system for regulating a flow rate of said effluent water.

30. A feed water heating stem for a power-generating plant as set forth in claim 14, which further comprises feed water flow regulating means for regulating a feed water flow rate of a flow rate supplied to said multistage steam injector, said feed water flow regulating means comprising:

a hollow regulating pipe being movable in axial directions in said water jet nozzle for said first stage of said first stage steam injector for adjusting an opening size of an outlet of said waterjet nozzle for said first stage, said effluent water being supplied into said hollow regulating pipe; and a nozzle driving actuator for moving said hollow regulating pipe in said axial directions.

31. A feed water heating system for a power-generating plant as set forth in claim 14, wherein said cylindrical container has a drain hole for discharging an overflow water, and a deaerating line for returning said overflow water discharged from said drain hole to said condenser or a low-pressure stage of said steam turbine via an orifice or a check valve, to deaerate said overflow water.

32. A feed water heating system for a power-generating plant as set forth in claim 14, which further comprises a deaerating line for returning a part of a feed water discharged from said jet centrifugal deaerator to said condenser via an orifice or a check valve and for deaerating said part of said feed water.

33. A feed water heating system for a power-generating plant as set forth in claim 14, wherein said cylindrical container has a drain hole for discharging an overflow water, and a returning line for returning said overflow water discharged from said drain hole to said condenser or a condensate storage tank via an orifice or a check valve.

34. A feed water heating system for a power-generating plant as set forth in claim 14, which further comprises:

a buffer tank for storing a feed water deaerated and discharged from said plurality of steam injector units;

feed water flow regulating means for regulating a feed water flow rate of a feed water supplied to said multistage steam injector; and stored volume measuring means for measuring a stored volume of a feed water stored in said buffer tank, said feed water flow regulating means controlling a revolving speed of a low-pressure condensate pump provided upstream of said steam injector system, or a flow regulating valve provided upstream of said steam injector system for regulating a flow rate of said effluent water, on the basis of a measured result of said stored volume measuring means so that said stored volume is a predetermined volume.

35. A feed water heating system for a power-generating plant as set forth in claim 14, which further comprises an auxiliary steam line, connected via an orifice or a check valve to a steam supply line for supplying said plurality of bled steams to said steam injector system, for supplying a main steam to said steam injector system when a turbine trip is carried out.

36. A feed water heating system for heating a feed water for a power-generating plant having a steam turbine, a condenser and a steam generator, said feed water heating system comprising:

a plurality of steam injector systems, arranged in series, for receiving a plurality of bled steams having different pressures extracted from said steam turbine and an effluent water discharged from said condenser to mix said effluent water with said plurality of bled steams to raise the temperature and pressure of a mixture of said effluent water with said plurality of bled steams to deaerate and discharge the temperature and pressure raised mixture, each of said steam injector systems comprising:

a cylindrical casing;

a plurality of steam injector units provided in said casing in parallel to each other; and a bled steam supply line, provided in said casing, for supplying a plurality of bled steams having different pressures extracted from said steam turbine to each of said plurality of steam injector units, each of said steam injector unit receiving said plurality of bled steams from said bled steam supply line and an effluent water discharged from said condenser to mix said effluent water with said plurality of bled steams to raise the temperature and pressure of a mixture of said effluent water with said plurality of bled steams to deaerate and discharge the temperature and pressure raised mixture, each of said steam injector units comprising:
- a multistage steam injector having a plurality of steam injectors connected in series for receiving one of said plurality of bled steams and a feed water to mix said one of said plurality of bled steams with said feed water to raise the temperature and pressure of a mixture of said one of said plurality of bled steams and said feed water to discharge the temperature and pressure raised mixture;
- a cylindrical container for housing therein said multistage steam injector; and
- a jet centrifugal deaerator, provided downstream of said multistage steam injector, for receiving a feed water discharged from said multistage steam injector and said bled steams to apply a centrifugal force to said feed water and said bled steams to deaerate said feed water to spatially separate a deaerated feed water from said bled steams to discharge said deaerated feed water.

* * * * *